United States Patent [19]
Pazos

[11] 3,872,057
[45] Mar. 18, 1975

[54] POLYMERS COUPLED BY NITROSO GROUPS

[75] Inventor: Jose F. Pazos, Wilmington, Del.

[73] Assignee: E. I. du Pont de Nemours and Company, Wilmington, Del.

[22] Filed: Feb. 2, 1973

[21] Appl. No.: 329,072

Related U.S. Application Data

[63] Continuation-in-part of Ser. No. 195,027, Nov. 2, 1971, abandoned.

[52] U.S. Cl....... 260/75 TN, 260/75 N, 260/77.5 R, 260/78 R, 260/80.78, 260/85.1, 260/94.7 N, 260/473 R, 260/476 R, 260/482 B, 260/561 R, 260/878
[51] Int. Cl............................................. C08g 22/10
[58] Field of Search........... 260/80.78, 85.1, 94.7 N, 260/77.5 R, 75 TN, 75 N, 78 R, 878, 476 R, 473 R, 561 R, 482 B

[56] References Cited
UNITED STATES PATENTS

| | | | |
|---|---|---|---|
| 3,309,373 | 3/1967 | Danzig | 260/94.7 N |
| 3,454,506 | 7/1969 | Brack | 260/94.7 N |
| 3,723,404 | 3/1973 | Davis et al. | 260/94.7 N |
| 3,751,523 | 8/1973 | Lachowicz et al. | 260/94.7 N |

*Primary Examiner*—Melvyn I. Marquis

[57] ABSTRACT

Compounds, preferably oligomers or polymers, are nitrosated to provide at least two nitroso groups on the average per molecule. At ambient temperatures the molecules couple by dimerization of the nitroso groups to modify the properties. At higher temperatures the nitroso dimer groupings dissociate so that the composition can be melt fabricated. Melt-compatible blends of different compounds can also be employed as the precursor materials.

26 Claims, No Drawings

3,872,057

POLYMERS COUPLED BY NITROSO GROUPS

RELATED APPLICATION

This application is a continuation-in-part of my application Ser. No. 195,027 filed Nov. 2, 1971 and now abandoned.

BACKGROUND OF THE INVENTION

1. Field of the Invention

This invention concerns nitroso- and nitroso dimer-containing organic polymers.

2. Description of the Prior Art

Although dimerization of nitroso groups is known, it has not been known heretofore to employ said dimerization to couple polymers heat-reversibly. It has not been known to apply dimerization of nitroso compounds to the preparation of useful articles.

Crosslinking of polymeric substances such as rubber and synthetic polymers is known to effect an increase in strength, toughness and wear resistance among other properties. Most crosslinking reactions so far known have effected permanent changes in the products so treated. Even art-known free-radical chloronitrosylation reactions produce polymers (oxime-containing) that permanently cross-link at elevated temperatures. The present invention, however, provides a new reversible coupling reaction leading to novel products that are strong and tough at ambient temperatures and that become workable at elevated temperatures above about 75°C.

Summary of the Invention

The present invention comprises nitrosated precursor compounds containing an average of at least two C-nitroso groups per molecule which are separated by at least six atoms from the nearest nitroso group, said precursor compounds being
i. organic monomers or polymers melt fabricable below 200°C, or
ii. melt-compatible blends of said monomers or polymers, said nitrosated precursor compounds coupling to polymers at ambient temperatures by dimerization of nitroso groups, but dissociating at elevated temperatures to assist melt fabrication.

Detailed Description of the Invention

The present invention is directed to polymeric products wherein nitrosated precursor molecules (which can be from relatively low molecular weight compounds to high molecular weight polymers) couple by dimerization of nitroso groups attached to differing molecules at ambient temperatures to increase the molecular weight and, in some instances, to crosslink the products. The coupling is heat-reversible so that, upon heating, the polymer can go from one containing all or nearly all the nitroso groups in the dimer form to the nitrosated precursor containing all or nearly all the nitroso groups in undimerized form. Intermediate polymer stages are those in which there are varying degrees of nitroso dimerization, i.e., coupling. The dimer units begin to dissociate to the monomeric form at temperatures of about 75°–140°C. The substances are then formable.

The uses to which the novel polymers can be put will be obvious to those skilled in the art upon a reading of this disclosure. The novel coupling effected herein links different molecules heat-reversibly to attain for the coupled polymers beneficial properties. Even though the coupled polymers are homopolymers or are otherwise similar in properties under ordinary circumstances, heat-reversible coupling (i.e., crosslinking or chain extension) invests them with obvious and heretofore unrealizable advantages.

One of the simple products of this invention, as described in Example 13 is a linear polymer such as

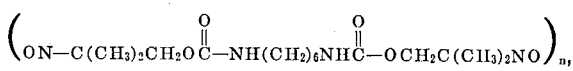

wherein $n$ is at least 2. The compound is liquid at 80° to 100°C and sets at room temperature to a tack-free solid in about one minute and is suitable as a quick-set printing ink.

As used herein the term "coupling" is meant generically to include lateral crosslinking and linear or substantially linear chain extension, or both.

The type of nitrosated precursor molecules which can be coupled to novel polymeric products, not surprisingly, is quite large. There must be at least two nitroso groups per molecule to achieve chain extension and the groups must be situated so that chain extension is favored rather than internal coupling to form cyclic compounds. Accordingly, the nitroso groups should be separated by at least six atoms.

Monomeric compounds, which generally have a definite formula, having a molecular weight of as little as 60 prior to nitrosation are suitable, particularly when the nitroso groups are attached directly to aliphatic carbon atoms. On the other hand, precursor materials can range up to high molecular weight polymers including elastomers and, after nitrosation may possess as many as 5,000 nitroso groups.

A feature of the present invention is the heat-formability of the products. To ensure this property the precursor molecules should melt or be heat-formable below about 200°C.

When the precursor compound is a high molecular weight compound the individual molecules will generally differ in molecular weight, and, if a copolymer in the distribution of comonomer units as will be apparent to those skilled in the art. Partial nitrosation will further create differences even between identical molecules. However, as is conventional in the art, such precursors and their nitrosation products are considered to be single substances.

This invention is not limited to coupled, single, nitrosated precursors in the sense above, but extends to mixtures of different nitrosated precursor compounds provided the precursor compounds, whether monomers or polymers, are melt compatible. For convenience such mixtures will be termed nitrosated melt-compatible blends.

Nitrosated melt-compatible blends can be made by nitrosation of a preformed blend by the procedure described hereinafter or alternatively, individual precursor substances can be nitrosated and thereafter mixed in solution or in the melt to form the blend. It will be understood however that in such nitrosated blends coupling occurs between the molecules of different nitrosated substances forming the blend as well as between molecules of the same substance.

The term "nitrosating agent" as employed herein, depending on its context, includes componds containing nitro groups that are reducible to nitroso groups. The "pendant groups" on which nitro groups or nitroso-containing moieties attach can be located at any point along the polymer chain including terminal carbon atoms. "Nitrosation" is the adding of nitroso groups to a precursor compound. Preferably the nitroso groups will be attached to primary, secondary and tertiary aliphatic carbons and any nitroso groups will be separated from one another by at least six atoms. Equally preferred are nitroso groups attached to aromatic carbon atoms

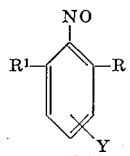

wherein R and R$^1$, alike or different, are chlorine, alkyl of 1–3 carbons and lower alkoxycarbonyl. Preferred substituents are chlorine and methyl. Y is a non-nitroso linking group with carbonyl being preferred.

The degree of nitrosation of high molecular weight materials, i.e., the number of nitroso groups in the coupled polymer(s), ranges from 1 per 400 of molecular weight of the polymer to 1 per 10,000 of molecular weight and preferably from 1 per 600 to 1 per 6,000 of molecular weight. For coupling very low molecular weight polymers or monomers it is necessary to have at least two nitroso groups per molecule. Since average molecular weights for such materials are accurately obtainable, it is easy to determine the degree of nitrosation that has been attained. It should be understood that the degree of nitrosation can be varied as will be understood by those skilled in the art to obtain any desired degree of polymer coupling within the limits set out above to obtain polymer systems of appropriate physical properties.

The preparation of linear polymers is illustrated in Examples 13, 23, 24, 26, 27 and others. Such polymers will generally have a molecular weight of about 40–1,000 for each nitroso group, and preferably a molecular weight of 100 to 400 per nitroso group.

In this application the term "precursor" is applied to compounds derived from the nitrosated compositions by replacement of each nitroso group with a hydrogen atom. In general the nitrosated precursors are not derived directly from the precursor but are formed by addition reaction to double bonds or by condensation of nitrosated compounds with non-nitrosated compounds.

PROCESS

The novel process of this invention is applicable generally to make all the novel nitroso-containing polymers of this invention whether the starting reactants are socalled "addition" polymers, "condensation" polymers or monomers. The process is applicable whether the nitrosating agents are reacted with polymers that contain carbon-carbon unsaturation or whether the reaction is by addition or condensation at pendant groups on the polymers chain.

The process involves reacting a nitrosating agent with a polymer so that nitroso groups are added to said polymer which nitroso groups heat-reversibly dimerize to couple the novel polymers. Operable temperatures are from about −80° to 120°C., and preferably from about −10° to 60°c. The intermediate monomer or polymer to be nitrosated may be in solution, dispersion, suspension or in bulk.

The nitrosating agent can be one or more of nitrosyl fluoride, chloride, or bromide, nitrogen trioxide, nitrogen dioxide or nitroso-containing compounds or nitro-containing compounds such as 2-methyl-2-nitropropanol, 2-methyl-2-nitrobutanol, 4-nitroso-4-methyl-1-pentanol, 4-nitroso-3,5-dichlorobenzoyl chloride, 2-hydroxyethyl 4-nitroso-3,5-dichlorobenzoate, 4-nitro-4-methylvaleric acid, 4-nitroso-4-methylvaleric acid and nitrosyl esters of carboxylic acids, for example, nitrosyl formate.

Solvents suitable for the nitrosation reaction include carbon tetrachloride, chloroform, methylene chloride, ether, dioxane, 1,2-dimethoxyethane and benzene. The reaction may also be carried out with bulk polymers using the gaseous nitrosating reagent or a solution thereof. Polymers may be blended with carbon and other fillers before or after contacting with the nitrosating agent.

When nitrosation occurs at a pendant group on the polymer chain, the process involves treating the intermediate polymer with a nitrosating agent containing carboxyl, chlorocarbonyl or hydroxyl groups to effect condensation with, or addition to, the pendant group.

A preferred process of this invention is to react a nitrosating agent selected from at least one of nitrosyl chloride, N$_2$O$_3$ and N$_2$O$_4$ with a polymer that contains an olefinic bond, at said olefinic bond. For example, in the copolymerization of 1,4-hexadiene with vinyl monomers, the 4–5 double bond is not affected by the polymerization reaction and is available for subsequent nitrosation. Similarly, polymers of butadiene, cyanoprene, chloroprene, isoprene and other 1,3-dienes contain intralineal and extralineal olefinic bonds that are readily available for nitrosation.

Equally preferred is the process of condensation of 4-nitroso-3,5-dichlorobenzoyl chloride with pendent hydroxyl or amino groups, and the process of condensation of 2-hydroxyethyl 4-nitroso-3,5-dichlorbenzoate with carboxyl or chlorocarbonyl groups.

Nitrosation usually occurs within a few minutes but longer reaction periods do no harm and reaction mixtures may be allowed to stand overnight or longer. The coupled polymers of this invention are readily molded at temperatures of 80° to 180°C, and preferably at 90° to 160°C.

INTERMEDIATE ADDITION POLYMER PRECURSORS

Addition polymers useful for nitrosating as taught herein include substituted and unsubstituted vinyl, vinylidene and vinylene polymers and copolymers. Substituents can be one or more of the following groups: halogen, cyano, nitro, alkyl and alkoxy of 1 through 4 carbon atoms, alkoxycarbonyl of 1 through 7 carbon atoms, aryl and aryloxy of 6 through 12 carbon atoms, acyl and aroyl, acyloxy of 2 through 17 carbon atoms, aroyloxy of 6 through 12 carbon atoms, acylamino and diacylimino, carbamyl, N-alkyl-carbamyl and N-arylcarbamyl, N,N-dialkylcarbamyl, alkanesulfonyl of 1 through 6 carbon atoms, arenesulfonyl of 6 through 12 carbon atoms, hydroxy, amino, alkylamino of 1 through 4 carbon atoms, dialkylamino of 2 through 8 carbon atoms, carboxyl and sulfonic acids. Preferred substituents include halogen, cyano, hydroxyl and alkyl, alkoxy groups of 1 through 4 carbon atoms, alkoxycarbonyl of 1 through 7 carbon atoms, carboxyl and amino groups. Especially preferred are carboxyl, hydroxyl and amino groups or groups convertible thereto.

All of the known vinyl, vinylidene and vinylene compounds are useful herein as monomers for intermediate polymer precursors. Representative preferred vinyl compounds for good polymer properties are the vinyl esters, vinyl ethers, vinyl halides, acrylic esters, and nitriles, and olefins and diolefins including terminal olefins and aryl-substituted olefins.

Specific compounds that are to be used in the practice of the invention include vinyl acetate and higher vinyl esters having up to 17 carbon atoms, vinyl pivalate, vinyl benzoate, methyl vinyl ether, ethyl vinyl ether, isobutyl vinyl ether, t-butyl vinyl ether, phenyl vinyl ether, N-vinyl acetamide, N-vinyl succinimide, N-vinyl phthalimide, and similar N-vinyl amides and imides, vinyl fluoride, vinyl choride, vinyl bromide, methyl vinyl ketone, ethyl vinyl ketone, t-butyl vinyl ketone, phenyl vinyl ketone, methyl acrylate, ethyl acrylate, the butyl acrylates, acrylamide, N-methylacrylamide and N-ethylacrylamide, N,N-dimethylacrylamide, N,N-diethylacrylamide, acrylanilide, N-methylacrylanilide, and corresponding methacrylanilides, acrylonitrile, ethylene, propylene, butene-1, 1,4-hexadiene, styrene, substituted styrenes such as o-, m- and p-fluorostyrene, o-, m- and p-chlorostyrene, o-, m- and p-cyanostyrene, o-, m- and p-methoxystyrene, o-, m- and p-methylstyrene, o-, m- and p-trifluoromethylstyrene, acrylic acid, vinyl sulfonic acid, p-nitrostyrene, p-dimethylaminostyrene, N-vinyl N-methylaniline, vinyl dimethylamine, vinyl diethylamine, nitroethylene, vinyl sulfonamide and vinyl sulfonanilide.

Especially preferred polymer systems for nitrosation include, inter alia, olefin and diolefin polymers and copolymers, unsubstituted or substituted with alkyl of 1 through 4 carbon atoms. For subsequent reactions with a nitrosating agent it is preferred to have pendent olefinic groups.

Vinyl polymers and copolymers that do not contain a double bond can be subjected to dehydration and deacylation reactions that will provide a double bond. For example, a vinyl alcohol (or vinyl acetate) unit can be dehydrated (or deacylated) to give an intralineal double bond for nitrosation. Preferred polymer starting materials for nitrosation include polyvinyl alcohol and polyvinyl acetate polymers and copolymers with, for instance, ethylene.

Similarly, a double bond, alpha to the ester or amide group, is readily introduced into polymers that contain α-haloester or α-haloamide units by removing the hydrogen halide elements from the polymer with base.

Vinylidene compounds useful in this invention include vinylidene fluoride and chloride, vinylidene cyanide, methyl, ethyl and butyl α-alkylacrylate such as methyl methacrylate, ethyl methacrylate, the butyl methacrylates, isobutylene, 2-methyl-1-butene, 2-ethyl-1-butene, α-methylstyrene, diethyl and dimethyl methylenemalonate, methylenemalonamide, N,N,N',N'-tetramethyl methylenemalonamide, methylenenorbornene, ethylidenenorbornene, and methyl α-cyanoacrylate. Preferred compounds for good results are vinylidene chloride, isobutylene, α-methylstyrene, methyl methacrylate, methyl α-cyanoacrylate and ethylidenenorbornene.

Vinylene compounds that can be used include fumaro- and maleonitrile, dimethyl and diethyl maleate and fumarate, and higher maleates and fumarates having a total of 12 carbons, fumaramide, maleamide and N-substituted and N,N-disubstituted maleamides and fumaramides, maleimide and N-alkylmaleimides in which the alkyl groups contain 1 through 4 carbons, and maleic anhydride.

Examples of intermediate copolymers, suitable for subsequent nitrosation include:
butadiene/vinyl chloride
butadiene/methyl methacrylate
isoprene/methyl fumarate
butadiene/diethyl fumorate
butadiene/styrene/acrylonitrile
2-chlorobutadiene(chloroprene)/2-fluorobutadiene-(fluoroprene)/styrene
butadiene/p-chlorostyrene
chloroprene/vinylidene cyanide
chloroprene/isoprene
chloroprene/styrene
2-fluorobutadiene/methyl methacrylate
2-fluorobutadiene/α-methylstyrene
isoprene/propylene
isoprene/2-vinylpyridine
isoprene/2,3-dimethylbutadiene
butadiene/acrylonitrile
butadiene/butyl acrylate
butadiene/diethyl maleate
butadiene/1,1-dihydroperfluorobutyl acrylate
butadiene/isoprene
butadiene/methacrylic acid
butadiene/methacrylonitrile
butadiene/methyl thiolacrylate
butadiene/nonyl methacrylate
butadiene/vinyl formate
chloroprene/hexachlorobutadiene
chloroprene/hexafluorobutadiene
chloroprene/vinyl isopropyl ether
chloroprene/vinyl methyl ether
butadiene/vinyl butyl ether Use of allyl methacrylate, allyl acrylate or diallyl maleate as monomers of comonomers with other monoolefins gives polymers with unpolymerized allyl groups. In the same way, crotyl acrylate and crotyl methacrylate can be used to obtain polymers that contain residual unsaturation from unpolymerized crotyl groups. Subsequent reaction of these unsaturated polymers with nitrosyl chloride or nitrogen trioxide gives the corresponding nitroso-containing polymer. The following pairs exemplify these polymers.
diallyl maleate/vinyl chloride
allyl acrylate/methyl vinyl sulfide
allyl acrylate/phenyl vinyl sulfide
allyl acrylate/N-vinylcarbazole
allyl acrylate/vinylidene chloride
allyl acrylate/N-vinylsuccinimide
crotyl acrylate/4-vinylpyridine
allyl methacrylate/acrolein
allyl methacrylate/acrylonitrile
crotyl methacrylate/p-iodostyrene
allyl methacrylate/methacrylamide
allyl methacryloxymethylpentamethyl disiloxane
allyl methacrylate/vinyl bromide
allyl methyacrylate/vinyl acetate
allyl methacrylate/vinyl benzoate
allyl acrylate/methyl vinyl ketone allyl methacrylate/methyl vinyl sulfone
allyl methacrylate/phenyl vinyl sulfone Polymers containing pendent groups can be condensed with nitroso compounds that also contain groups complementary to the pendant groups of the polymer. For example, polymers containing hydroxyl groups, e.g., polyvinyl alcohol, $-(CH_2-CHOH)-$, may be esterified with a nitro organic acid, for example, 4-nitro-4-methylvaleric acid, and the nitro group reduced to a nitroso group. Alternatively, esterification can be carried out with a nitroso organic acid, for example, 4-nitroso-4-methylvaleric acid or 4-nitroso-3,5-dichlorobenzoyl chloride and the nitroso-containing polymer obtained directly. In analogous manner, acid-containing groups in the polymers can be esterified with such compounds as 2-methyl-2-nitropropanol with subsequent reduction of the nitro to a nitroso group. Or, one can start with a nitroso-containing alcohol. For instance, copolymers containing acrylic or alkacrylic groups, e.g., acrylic acid or acrylyl halide can be readily esterified with such alcohols as 4-nitroso-4-methyl-1-pentanol, $HO(CH_2)_3C(CH_3)_2-NO$, as can maleic and fumaric acid groups.

When maleic anhydride, itaconic anhydride or other unsaturated anhydrides are used as comonomers, the pendant anhydride groups in the polymer chain can be esterified with an alcohol to provide sites for nitroso group coupling. For example, reaction with allyl or crotyl alcohol gives an allyl or crotyl ester which can be nitrosated with, say, $N_2O_3$ to obtain the desired nitroso containing polymers. Likewise, reaction of the anhydride groups with $HO(CH_2)_3C(CH_3)_2NO$ or with 2-hydroxyethyl 4-nitroso-3,5-dichlorobenzoate leads directly to a nitroso-containing polymer. Polymers containing anhydride units which give nitroso-containing polymers include the following:

maleic anhydride/isobutyl vinyl ether
maleic anhydride/dodecyl vinyl ether
maleic anhydride/α-methylstyrene
maleic anhydride/vinyl acetate
itaconic anhydride/styrene
maleic anhydride/m-chlorostyrene
itaconic anhydride/p-methylstyrene
itaconic anhydride/p-trifluoromethylstyrene and
itaconic anhydride/m-methoxystyrene Other useful monomers include tetrafluoroethylene, trifluoroethylene, chlorotrifluoroethylene, 1-fluoro-1-chloroethylene, and 1,1-difluoro-2-chloroethylene.

INTERMEDIATE CONDENSATION POLYMER PRECURSORS

Useful condensation polymers include substituted and unsubstituted polyesters, polythiolesters, polyamides, polythioamides, polyimides, polythioimides, polyurethanes, polythiourethanes, polyureas, polythioureas, polyethers, polythioethers, polyamines, polyacetals and silicone polymers. Preferred substituents include halogen, hydroxyl, carboxyl, cyano, amino, and alkyl and alkoxy of 1 through 4 carbon atoms. Preferred condensation polymers include those containing polyurethane, polyamide, polyester and polyether linkages which polymers are chain extended via nitrosodimerization. Polyesters are particularly preferred.

Polyesters containing nitroso groups are readily prepared from polyesters which contain some carbon-carbon unsaturation in the polymer by nitrosation with, say NOCl. The unsaturated polyesters are obtained by replacement of all or a portion of the normal acid, ester, anhydride or alcohol moieties with similar moneties containing carbon- carbon unsaturation. For example, replacement of a portion of the adipic acid, phthalic acid, etc., with itaconic acid or anhydride, citraconic acid, the "dimer acids" obtained from unsaturated fatty acids, dihydromuconic acid,

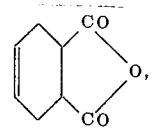

or similar unsaturated acids or anhydrides gives an unsaturated polyester suitable for nitrosation. Similarly, replacement of a portion of the diol or triol component with 1,4-butenediol or similar unsaturated diol gives an unsaturated polyester.

Alternatively, use of a nitroso-containing component, i.e., 4-nitroso-3,5-dichlorobenzoyl chloride or 2-hydroxyethyl 4-nitroso-3,5-dichlorobenzoate, in the preparation of the polyester as illustrated in specific examples below leads to the desired nitroso-containing polyesters. Alternatively, a regular polyester containing an excess of hydroxyl groups can be treated with a mixture of a nitroso-containing acid, for example 4-nitroso-4-methyl valeric acid, and i-butyl chloroformate or with a nitroso-containing acid chloride to effect esterification of these free hydroxyl groups and provide the desired nitroso-containing polyester.

Polythioesters containing nitroso groups can be prepared in a similar way to the above-described polyesters by replacement of the alcohol component of the reaction mixture with a thiol, for example, 1,6-hexanedithiol. The unsaturated thiol polyester obtained by reaction with an unsaturated polyacid is nitrosated by addition of, say, NOCl in the usual way.

Polyamides containing nitroso groups can be prepared by nitrosation of an unsaturated polyamide. For example, replacement of all or a portion of the adipic acid used in preparing a saturated polyamide with dihydromuconic acid gives the desired unsaturated polyamide. Thus, a mixture of adipoyl chloride, dihydromuconoyl chloride and 2,5-dimethylpiperazine undergoes a normal interfacial polycondensation to give the desired unsaturated polyamide, suitable for subsequent nitrosation. A preferred class of nitrosated polyamides melting below 200°C is obtained by reacting at least one aliphatic primary or secondary diamine containing from 4 to 20 carbon atoms with at least one dicarboxylic acid halide which can be an aliphatic dibasic acid halide of from 6 to 12 carbon atoms, terephthaloyl halide or isophthaloyl halides and 4-nitroso-3,5-dichlorobenzoyl halides. Especially preferred diamines are hexamethylene diamine and hexamethylene diamine optimally having two N-alkyl substituents of 1 to 6 carbon atoms. The preferred dibasic acid halide is adipoyl chloride.

Polyurethanes containing nitroso groups are contained by nitrosation of an unsaturated polyurethane in the usual way. For example, reaction of an unsaturated polyester diol (prepared from a mixture of adipic acid,

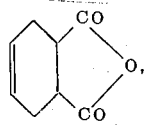

ethylene glycol and 1,4-butanediol) with methylene bis(4-phenylisocyanate) gives a polyurethane containing carbon-carbon unsaturation, suitable for nitrosation. Alternatively, a polyurethane containing nitroso groups in the polymer chain can be prepared from a nitroso-containing intermediate as illustrated in Examples 13, 42 and 43.

If the diisocyanate above is replaced with a diisothiocyanate, for example

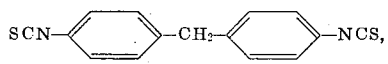

the polymer obtained is a nitrosated polythiourethane.

Other classes of condensation polymers, suitable for heat-reversible coupling by nitroso dimerization, are polyureas and polythioureas. These can be prepared in solution by reaction of a diisocyanate or diisothiocyanate with a diamine. If a portion of the diamine contains carbon-carbon unsaturation the polyurea or polythiourea can be nitrosated in the usual way to obtain the desired nitroso-containing polymer. For example, replacement of a part or all of N,N'-dipropyl-1,4-butanediamine with N,N'-dipropyl-1,4-diamino-2-butene in its reaction with decamethylenediisocyanate (use of decamethylenediisothiocyanate gives the corresponding polythiourea) gives an unsaturated polymer suitable for nitrosation.

Unsaturated polythioethers, suitable for nitrosation with NOCl, $N_2O_3$ or $N_2O_4$, may be obtained by replacement of a portion of the 1,4-dibromobutane with 1,4-dibromo-2-butene in its reaction with the disodium salt of hexamethylenedithiol.

Polyacetals, for example polyformaldehyde, may also be chain-extended via nitroso dimerization by endcapping a typical formaldehyde polymer by reaction with 4-nitroso-4-methylvaleric acid and i-butylchloroformate or with 4-nitroso-3,5-dichlorobenzoyl chloride. Subsequent chain extension is achieved via dimerization of the nitroso groups.

Silicones containing nitroso groups may be coupled by nitroso dimerization. For example, hydrolysis of benzylvinyldichlorosilane gives a silicone polymer with a vinyl group attached to the silicon atom. Nitrosation with $N_2O_3$ gives the corresponding nitroso-containing silicone polymer.

A variety of low molecular weight compounds can be employed as starting materials. For example, α,ω-diols, $HO(CH_2)_xOH$ wherein $x$ is from 2–20 can be reacted with 4-nitroso-3,5-dichlorobenzoyl chloride in the presence of a base to give products which form fluid melts but which polymerize by dimerization of the nitroso groups. Polyglycols of the formula $HO[(CH_2)_x-O]_yH$ wherein $x$ is from 2–20 and $y$ can be from 1 (i.e., the above diols) to an average value of about 100 and in particular polyethylene glycols of the formula $HO(CH_2CH_2O)_yH$ wherein $y$ is from 1 to an average value of 100 or polyesters derived therefrom by reaction with an adipoyl halide or terephthaloyl halide can likewise be reacted with a 4-nitroso-3,5-dichlorobenzoyl halide, preferably chloride to give products which are useful for making quick setting printing inks when combined with suitable pigments. Primary or secondary diamines can be reacted with nitroso aliphatic acids to produce low molecular weight dinitroso diamides which polymerize by chain extension. For this purpose the diamine will have from 4–12 carbon atoms and the nitroso acid will have from 2–12 carbon atoms. 1,6-Hexamethylene diamine, 1,12-diaminododecane, piperazine and the like can be employed as the diamines and reacted with nitroso acids such as nitroso-4-methylvaleric acid or with p-nitrosobenzoyl chloride having two substituents ortho to the nitroso group selected from halogen, lower alkyl or lower alkoxy wherein "lower" is employed to refer to groups containing 1 to 3 carbon atoms.

DESCRIPTION OF THE PREFERRED EMBODIMENTS

The following Examples are meant to illustrate but not to limit the invention.

In several of the following Examples, a depiction is given of the uncoupled nitroso-containinig polymer and of the coupled nitroso dimer-containing polymer. Only that portion of the polymer molecule is shown that is pertinent to depict the nitroso attachment thereto. In each instance, the constituency of the unshown portion of the polymer molecule will be understood by those skilled in the art. Only one depiction of an equilibrium is shown in each instance for the sake of simplicity.

In each depiction, the length of the polymer molecule and the number of polymer couplings is in accord with the disclosed scope of this invention.

EXAMPLE 1

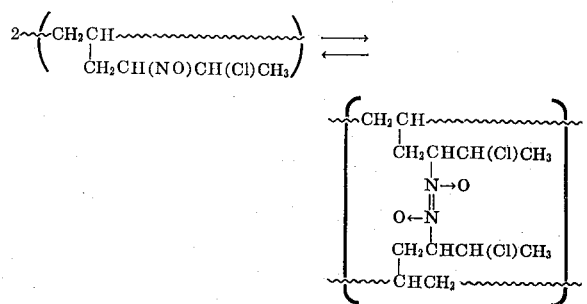

A. Making the nitrosated, coupled polymer.

A 1-liter resin kettle fitted with a mechanical stirrer was charged with a solution containing 50 g of an ethylene/propylene/1,4-hexadiene (64/32/4 by weight) terpolymer in 0.5 liter of benzene. A solution of 2.3 ml of nitrosyl chloride in 20 ml of methylene chloride was added dropwise over a period of about 5 minutes, during which time the polymer solution increased in viscosity and finally gelled. Solvent and excess nitrosyl chloride were removed by pumping at 0.1 mm overnight. Analysis found: N, 0.8%; Cl, 0.4%. Ultraviolet, no maximum, only cutoff shown, but strong at 300 nm, where the group, —NO—NO—, absorbs. The infrared spectrum showed some residual double bond at 960 $cm^{-1}$ and new strong absorption at 1,550 $cm^{-1}$.

B. Demonstration of coupling.

A 1-gram sample of the nitrosated, crosslinked polymer of Part A was stirred with 50 ml of benzene at 50 to 60°C. for ½ hour. On filtration, 0.55 grams of benzeneinsoluble, coupled polymer was recovered. Evaporation of the filtrate yielded 0.15 g of polymer residue.

C. Dissociation of the nitroso dimer linkages.

A 1-g sample of coupled polymer was stirred with 50 ml of benzene containing 1.0 g of 2,6-dichloronitrosobenzene for 30 minutes. Filtration showed the absence of coupled polymer.

D. Solubilization of coupled polymer.

Solubilization of the nitrosated, coupled polymer occurred when the polymer was stirred with ethyl 3,5-dichloro-4-nitrosobenzoate at 50° to 60°C.

E. Films.

The product of Part A was pressed into a selfsupporting film by heating to 100°C. under 10,000 psi pressure.

EXAMPLE 2

The apparatus of Example 1 was charged with a solution of 50 g of ethylene/propylene/1,4-hexadiene (64/32/4 by weight) terpolymer in 0.5 liter of carbon tetrachloride. The mixture was heated to dissolve the polymer, then cooled to about −10°C. A solution of 1.64 g of nitrosyl chloride in 20 ml of methylene chloride was added dropwise over a 2 to 3 minute period. After stirring for 15 minutes, the mixture gelled. The solvent was pumped off for 72 hours at 0.1 mm yielding 51.2 g of coupled ethylene/propylene/1,4-hexadiene terpolymer.

Analysis found: N, 0.5%.

EXAMPLE 3

A 2-liter resin kettle was charged with 50 g of ethylene/propylene/1,4-hexadiene (64/32.5/3.5 by weight) terpolymer, in pieces of about 1 g, suspended in 1.0 liter of anhydrous ether. The atmosphere in the reactor was changed to nitrogen and the mixture stirred while adding 0.58 ml of nitrosyl chloride in 20 ml of carbon tetrachloride. After 16 hours at room temperature, the mixture was filtered and the solid product pumped free of solvent. The infrared spectrum showed the disappearance of some double bond. A thin film of the product of a similar preparation showed a strong maximum in the ultraviolet at 300 nm which is typical of dimers of alkyl nitroso compounds (see Henry Feuer, editor, "The Chemistry of Nitro and Nitroso Groups," Part 1, Interscience, 1969, p. 150).

Improved tensile strengths and elongation measurements were obtained for the coupled polymer in comparison to the nonnitrosated starting polymer. Samples of the coupled, nitrosated polymer were molded under the conditions shown below in Summaries A and B. The control (C) is the nonnitrosated terpolymer equivalently molded. Tensile and elongation properties are much improved for the crosslinked polymer. What is also significant is that the terpolymer was effectively nitrosated while suspended in pieces in a solvent. This demonstrates that nitrosation can be effected (to improve polymer properties) on solid polymer as well as on liquid polymer solutions.

|  | $T_B$ (psi) | $E_B$ (%) |
|---|---|---|
| A. Two minutes at 125°C., then cooled in running water | 425 | 280 |
| B. Ten minutes at 110°C., then cooled in running water | 370 | 240 |
| C. Control (untreated E/P/HD terpolymer) | 110 | 2220 |

EXAMPLE 4

A 250-ml flask, fitted with stirrer and addition funnel was charged with 100 ml of a 5percent solution of ethylene/propylene/1,4-hexadiene (64/32.5/3.5 by weight) terpolymer in benzene. Dropwise addition of 100 ml of dioxane caused clouding and some precipitation. Next, 0.116 ml of nitrosyl chloride in 2 ml of carbon tetrachloride was added at once and the mixture stirred vigorously for several hours. Removal of the solvent gave a white, coupled polymer. The ultraviolet spectrum of a pressed film showed a strong maximum at 300 nm and a minimum at 253 nm.

EXAMPLE 5

The apparatus of Example 4 was charged with 100 ml of 5 percent solution of ethylene/propylene/1,4-hexadiene (64/32.5/3.5 by weight) terpolymer in carbon tetrachloride, followed by the addition of 5 ml of dioxane and 2 ml of a nitrogen trioxide solution (prepared by diluting 1.3 ml of nitrogen trioxide with 20 ml of carbon tetrachloride). The mixture was stirred for about 2 hours and formed a gel overnight. A white, coupled polymer (5.4 g) was precipitated by blending the gel with methanol.

EXAMPLE 6

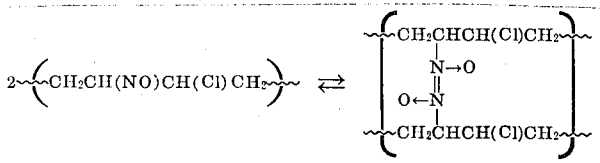

In a 1-quart glass blender under nitrogen a solution of 10 g of styrene/butadiene (23.5/76.5 by weight) copolymer in 300 ml of dry chloroform was rapidly agitated as a solution of 1.4 g of nitrosyl chloride in 20 ml of chloroform was added as quickly as possible. Within 30 seconds a firm gel formed and stopped the blender motor. After 3 hours at room temperature, the supernatant chloroform was decanted and the remaining gel freed of chloroform under reduced pressure at 40°C. There was obtained 11.8 g of a reddish-brown, rubbery coupled polymer. Analysis indicated a nitrogen content of 1.68 percent. The crosslinked polymer can be compression molded.

A 5 × ¾ inch 80-mil bar was compression-molded at 160°C, 20,000 lbs for 5 minutes. A portion of the bar was immersed in hexane for 1 day during which time the bar increased in thickness only 7 percent. Such slight increase in thickness indicates that the product is suitable for use as a gasket material.

EXAMPLE 7

A dispersion of 20 g of an ethylene/propylene/1,4-hexadiene (64/32/4 by weight) terpolymer in a mixture of 400 ml of dry methylene chloride and 20 ml of dry dioxane was stirred rapidly in a 1-quart glass blender as 1.5 g of nitrogen trioxide in 20 ml of methylene chloride was added rapidly. The colorless system changed immediately to a greenish-yellow and then to a light golden yellow. After 1.25 hours, the stirrer was stopped and the insoluble gel was filtered, washed on the filter with methylene chloride, and dried at 40°C under a reduced pressure of 1 mm for 3 days. There was obtained 19 g of a pale greenish-white coupled polymer solid. The nitrogen content was found to be 0.81 percent. Direct molding into useful articles.

A bar of the above treated polymer molded at 160°C for 5 minutes exhibited a $T_B/E_B$ of 434 psi/1,040 percent compared to $T_B/E_B$ of 91 psi/665 percent for the original terpolymer.

Treated polymer of Part A (10 g), mixed on a rubber mill with 5 g of a fast extrusion furnace carbon black was molded at 160°C for 20 minutes. The molded bar had $T_B/E_B$ of 935 psi/395 percent. A terpolymer/carbon black control bar had $T_B/E_B$ of 166 psi/190 percent. When the original terpolymer was milled first with the carbon black, cut to small pieces and contacted with $N_2O_3$ in methylene chloride/dioxane dispersion, the polymer contained 0.6 percent of nitrogen and a molded bar from this product had $T_B/E_B$ of 934 psi/287 percent.

This polymer is suitable for direct molding into such useful objects, inter alia, as handle bar grips, and solid tires for small vehicles.

EXAMPLE 8

A solution was made of 20 g of an ethylene/propylene/1,4-hexadiene (64/32.5/3.5 by weight) terpolymer in a mixture of 400 ml of dry chloroform and 20 ml of dry dioxane. The solution was cooled under nitrogen to 10°C in a 1-quart glass blender and was rapidly agitated as 0.5 g of nitrogen trioxide in 10 ml of dry chloroform was added. The solution was stirred for 10 minutes and allowed to stand at room temperature overnight. A portion of the polymer was precipitated by pouring the solution into methanol and was dried under the reduced pressure of 1 mm at 40°–50°C for several days to give a light tan, rubbery coupled polymer containing 0.75 percent of nitrogen.

A 9–10 mil film molded at 180° for 1 minute exhibited a tensile strength of 481 psi at 2,130 percent elongation at break (average of two determinations). A bar molded of untreated ethylene/propylene/1,4-hexadiene terpolymer had a $T_B/E_B$ of 80 psi/2,261 percent (average of five determinations).

EXAMPLE 9

A dispersion of 20 g of an ethylene/propylene/1,4-hexadiene (64/32.5/3.5 by weight) terpolymer in 400 ml of anhydrous ether was treated in a 1-quart glass blender with a solution of 0.5 g of nitrogen trioxide in 10 ml of anhydrous ether. After 30 minutes of stirring, the fairly green dispersion was filtered and dried at 25°C under a reduced pressure of 1 mm overnight to give 16.9 g of a tough, rubbery, white coupled polymer containing 0.25 percent nitrogen.

EXAMPLE 10

A solution of 20 g of an ethylene/propylene/1,4-hexadiene (64/32.5/3.5 by weight) terpolymer in a mixture of 400 ml of dry carbon tetrachloride and 20 ml of dry dioxane was cooled under nitrogen in a 1-quart glass blender to 10°C and then stirred rapidly as 0.5 g of nitrogen trioxide in 10 ml of dry carbon tetrachloride was added quickly. The system was very viscous in 3 minutes and was gelled within 3 ½ minutes. After standing at room temperature for several days, the solvents were removed under reduced pressure and the polymer dried at 40°C/0.05 mm overnight to give 19 g of yellowish-green polymer containing 0.66 percent nitrogen.

EXAMPLE 11

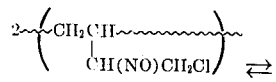

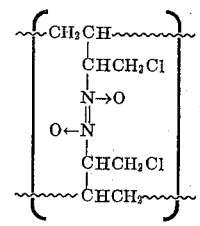

A solution of 10 g of liquid poly-cis-1,2-butadiene (molecular weight, 2,000) in 200 ml of dry chloroform was stirred rapidly under nitrogen at 10°C in a 1-quart glass blender as a solution of 3.4 g of nitrosyl chloride in 20 ml of dry chloroform was added rapidly. The solution became a dark yellow-brown in color that changed to lemon color in 27 minutes, at which point the system had gelled. Solvent was removed by a nitrogen stream flowing over the polymer overnight, and then it was heated at 40°C/1 mm for 2 days. There was obtained 8.88 g of an amber, tacky coupled polymer solid containing 2.1 percent nitrogen.

On a metal block the polymer gave a fluid melt at 100°C but changed to a nontacky solid at 150°C and was no longer soluble in acetone. The adhesive properties of the coupled polymer were shown as follows. Two pine panels 2 × 6 × 3/16 inch were painted with the polymer in the melt at 100°C and were then clamped together and heated 10 minutes at 150°C. After the clamps were removed, the boards remained firmly bonded together.

EXAMPLE 12

A solution of 10 g of poly-cis-1,4-butadiene ($\eta_{inh} = 2.97$ at 0.1 percent in chloroform at 25°C) in 300 ml of dry chloroform was stirred rapidly under nitrogen in a 1-quart, ice-water cooled, glass blender at 8°C as a solution of 0.34 g of nitrosyl chloride in 20 ml of dry chloroform was added rapidly. A temperature surge to 23°C occurred in 2 minutes at which point the polymer had gelled. The greenish-yellow gel was allowed to stand at room temperature for 1.5 hours, then was broken up in a blender, and the solvent evaporated with a nitrogen sweep overnight, followed by treatment for 3 days at 24°–40°C at 1–2 mm in a vacuum oven. Tan rubbery coupled polymer solid (10 g) was obtained containing 0.54 percent nitrogen. This was molded into films at 150°–180°C.

When this example was repeated, except for an increase to 4.4 g of nitrosyl chloride and the change from chloroform medium to a mixture of 100 ml of chloroform and 200 ml of methylene chloride, gelation occurred within 30 seconds. There was obtained 12 g of dark, rubbery coupled polymer solid containing 3.60 percent nitrogen. Dark, flexible films 30 mils thick were pressed at 150°–180°C. A portion of film immersed in hexane one day increased only 7 percent in thickness, indicating usefulness of this polymer as a gasket material.

EXAMPLE 13

A. Adduct of Hexamethylenediisocyanate with 2-Methyl-2-nitro-1-propanol

Hexamethylenediisocyanate (230 g, 1.369 mols) was added to a solution of 325.8 g (2.738 mols) of 2-methyl-2-nitro-1-propanol in 1.5 liters of benzene. A few drops of dibutylin dilaurate was added, and the reaction was stirred overnight at room temperature. The solution was placed in crystallizing dishes and it slowly crystallized to give 600 g (wet with benzene) of bis(2-methyl-2-nitropropyl)-N,N'-hexamethylenedicarbamate; mp 78°–79°C. Infrared (nujol) showed urethane and nitro bands; nmr showed only one type of methyl at 1.63 $\tau$.

B. Reduction of Dinitrocarbamate to Dihydroxylamine

The dinitrocarbamate of Part A (26.3 g, 0.1 equivalent), was dissolved in 150 ml of n-propanol. This solution was diluted with 150 ml of water containing 1 g of ammonium chloride without precipitation. Zinc (18.0 g, > 0.2 mol) was added portionwise, letting the temperature rise from 23° to 50°C. After a few hours, the color had changed from dark grey, to a very light (almost white) grey. After filtration, the solution was saturated with $Na_2CO_3$, whereupon separation into two layers occurred. Tetrahydrofuran (300 ml) was added, and the organic layer was dried and evaporated. The residue was a very viscous oil. Upon addition of acetonitrile (100 ml), the white, crystalline solid, bis(2-methyl-2-hydroxylaminopropyl)-N,N'-hexamethylenedicarbamate, separated; mp 118°–119°C; ir (nujol) 3,330 (s); nmr ($CD_3CN$) showed one type of methyl at 0.78 $\tau$.

C. A solution of 11.34 g of the product of Part B,

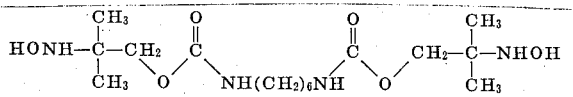

in 500 cc of water was stirred at 40°C while a solution of sodium hypobromite (4.8 g of sodium hydroxide and 9.6 g of bromine) in 100 cc of water was added over a period of 5 minutes. A tacky, blue coupled polymer solid was obtained. This polymer was dissolved in 500 cc of acetone and diluted to 2,000 cc with distilled water and stored at 10°C for 72 hours. Filtration afforded 3.8 g of a slightly blue polymer. The nmr was consistent with the dinitroso structure,

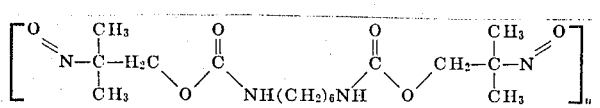

wherein $n$ is at least 2.

This powder can be melted at 80°–100°C to a fluid blue liquid and, when touched to paper is absorbed very well and hardens quickly (in about a minute or less) as the nitroso groups dimerize, and the blue color fades.

Anal. Calcd for $C_{16}H_{30}N_4O_6$: C, 51.32; H, 8.08; N, 14.96
Found: C, 51.06; H, 7.83; N, 14.43

EXAMPLE 14

Two colorless 5 × 0.75 × 0.08 inch bars of an ethylene/propylene/1,4-hexadiene (64/32.5/3.5 by weight) terpolymer were molded at 160°C for 5 minutes at 20,000 lbs pressure and suspended in a 1-liter stainless steel vessel in an atmosphere of nitrogen. The vessel was then pressured with NOCl from a lecture bottle (27 lb pressure). After 4 hours at room temperature, the excess NOCl was removed by evacuating the vessel. The bars were greenish-yellow, but on standing overnight changed to a light bluish-green. The nitrogen content was found to be 0.65 percent. One bar was found to have a $T_B/E_B$ 295 psi/223 percent. A similar bar before treatment exhibited a $T_B/E_B$ of 80 psi/2261 percent.

The second treated bar was heated at 160°C for 20 minutes under 20,000 lb pressure. It was now light amber and exhibited a $T_B/E_B$ 351 psi/1027 percent.

EXAMPLE 15

Equal weights of an ethylene/propylene/1,4-hexadiene (64/32/4 by weight) terpolymer and a fast extrusion furnace carbon black were blended together on a rubber mill, and a 5 × 0.75 × 0.08 inch bar molded at 160°C for 5 minutes under 20,000 lb pressure. This bar was treated with gaseous NOCl in a glass vessel at one atmosphere for 19 hours. It now contained 0.55 percent nitrogen and had a $T_B/E_B$ 2371 psi/322 percent. Its moduli at 100 percent, 200 percent and 300 percent elongation ($M_{100}$, $M_{200}$ and $M_{300}$) were 1,045, 1,667, and 2,269 psi. A similar terpolymer/carbon black bar without nitrosyl chloride treatment had a $T_B/E_B$ 263 psi/150 percent.

EXAMPLE 16

A freshly prepared bar of the terpolymer/carbon black blend of Example 15 was dipped into a solution of 30 ml of liquid nitrosyl chloride dissolved in 600 ml of methylene chloride for 30 minutes at room temperature and then stored in a gently stream of nitrogen for several hours. This now tough, smooth bar contained 0.3 percent nitrogen and exhibited a tensile strength of 3.030 psi at 502 percent elongation (average of three determinations). Its moduli at 100 percent, 200 percent, and 300 percent elongation were 676, 1,338 and 1,975 psi. A 20-minute treatment in a refluxing methylene chloride solution of nitrosyl chloride gave a bar with 0.3 percent nitrogen and a tensile and elongation of 2,956 psi at 512 percent (average of three determinations). The moduli at 100 percent, 200 percent and 300 percent elongation were 645, 1,270 and 1,870 psi.

EXAMPLE 17

Forty-one grams of an ethylene/propylene/1,4-hexadiene (64/32.5/3.5 by weight) terpolymer was cut into 1 × 1/2 × 1/4 inch chunks and placed in a 500-ml round bottom flask. The flask was evacuated and $N_2O_3$ was bled in to atmospheric pressure. After 30 minutes the flask was again evacuated to remove the excess $N_2O_3$. The terpolymer had taken on a pale green-blue hue, but on standing several days it changed to light yellow. Analysis indicated a nitrogen content of 0.78 percent in the coupled polymer.

The chunks of treated terpolymer of this example did not stick together when stored at room temperature and could still be easily separated after storing 4 days at 175°F. Untreated terpolymer flows together into a solid mass under the high temperature storage conditions. The nitrosation reaction thus gives a product that remains friable in storage for facile manipulation or compounding.

Chuns of styrene/butadiene copolymer treated similarly with $N_2O_3$ became nontacky and could be stored without becoming a solid mass.

EXAMPLE 18

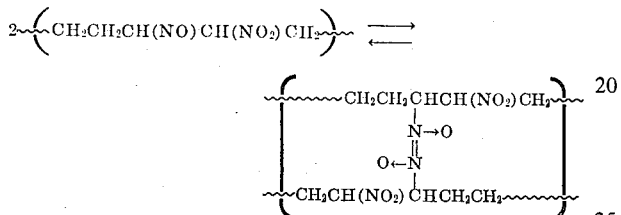

An ethylene/vinyl acetate (88.2/11.2 mol) copolymer was pyrolyzed at elevated temperature to split out sufficient acetic acid to leave 2.2 mol percent unsaturation in the polymer. This unsaturated ethylene/vinyl acetate polymer (15 g) was dissolved in 250 ml of methylene chloride. To this solution was added 12.5 ml of dioxane, and as the solution was stirred rapidly under nitrogen, 0.5 g of $N_2O_3$ in 20 of methylene chloride was added rapidly. Stirring was continued for 5 minutes. After standing 1 hour at room temperature, the solution was evaporated in a rotary evaporator to a gel, which was dried overnight in a vacuum oven at 45°C/1 mm to give 12 g of a greenish nitrosated ethylene/vinyl acetate polymer containing 1.1 percent nitrogen.

A bar of this coupled polymer molded at 100°C and 2,000 lbs pressure for 1 minute exhibited at $T_B/E_B$ of 634 psi/> 1,000 percent. This compares with a $T_B/E_B$ of 337 psi/611 percent for the unsaturated polymer before treatment with $N_2O_3$ and 240 psi/350 percent for the original ethylene/vinyl acetate polymer before pyrolysis.

As will be understood by those skilled in the art, the ethylene/vinyl acetate copolymer can be hydrolyzed to remove acetic acid and form the corresponding ethylene/vinyl alcohol polymer. Nitrosation of this polymer, then, can be effected with a nitro- or nitroso-containing organic acid such as, say, 4-nitroso-4-methylvaleric acid.

EXAMPLE 19

A molded bar of an ethylene/propylene/1,4-hexadiene 53/43.5/3.5 by weight) terpolymer, previously compounded with an equal weight of a fast extrusion furnace carbon black, was exposed to $N_2O_3$ vapors at 1 atmosphere in a glass vessel for 1.6 hours. At the end of this exposure, the bar contained 0.70 percent nitrogen. Its $T_B/E_B$ was 706 psi/255 percent. Its moduli at 100 percent and 200 percent were 436 and 642 psi, respectively. A compounded bar before the $N_2O_3$ treatment had a $T_B/E_B$ of 144 psi/23 percent.

EXAMPLE 20

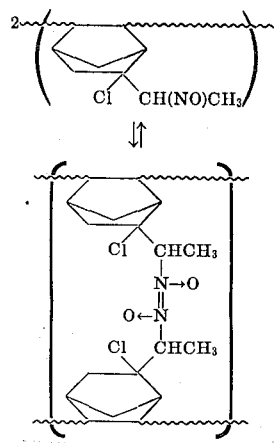

Equal parts of ethylene/propylene/ethylidenenorbornene (0.6 mol unsaturation/kg) and a fast extrusion furnace carbon black were milled together and molded into a bar at 160°C for 5 minutes. The bar was suspended in a resin kettle, which was then evacuated and filled with NOCl gas by bleeding in from a cylinder.

After 19.3 hours the NOCl was removed by vacuum for 1 hour, then the bar was placed in a vessel through which a slow flow of nitrogen was maintained overnight. The bar now contained 0.88 percent nitrogen and 2.10 percent chlorine. This is an exact 1:1 ratio as expected from addition of NOCl to double bonds. It was found to possess a tensile strength of 2,653 psi with an elongation of 378 percent at break. Its moduli at 100 percent, 200 percent and 300 percent elongation ($M_{100}$, $M_{200}$, $M_{300}$) were 1,058, 1,627 and 2,246 psi, respectively. A similar bar before nitrosation had a tensile strength of 265 psi with an elongation of 190 percent at break.

EXAMPLE 21

A. Preparation of the Dimer of 4-Nitroso-4-methylvaleric Acid

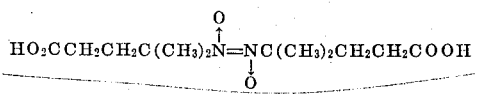

To a solution of 20 g of sodium hydroxide in 500 ml of water was added 871.5 g (0.5 mol) of the methyl ester of 4-nitro-4-methylvaleric acid which can be made by the procedure given in Organic Synthese, Coll. Vol. IV, p. 652, John Wiley & Sons, Inc., New York, N. Y., 1963. The mixture was heaated and stirred for a few minutes to give a clear, aqueous solution of the sodium salt of the nitro acid. This solution was evaporated under reduced pressure to a volume of about 250 ml.

The pH was adjusted to 7 by addition of a little aqueous hydrochloric and then 37 g of ammonium chloride was added. Zinc dust was then added while controlling the temperature to a maximum of 80°C by cooling. The reaction miixture was then allowed to cool to 40°C over 2 hours. The insoluble zinc oxide was removed by filtration and the filter cake washed with three 50-ml portions of water. Filtrate and washings were combined and cooled to +5°c and held at this temperature while adding a solution of 26 ml of bromine in 500 ml of 8 percent sodium hydroxide in water over 1 hour. The bright blue reaction mixture was made acidic with aqueous hydrochloric acid and then extracted with methylene chloride. The bright blue methylene chloride solution of 4-nitroso-4-methylvaleric acid was dried and evaporated to leave 50 ml of blue oil. When the oil was taken up in 25 ml of methylene chloride and allowed to tand overnight at room temperature, colorless crystals or the nitroso acid dimer were deposited, which were collected and air-dried (17 g). After recystallization from chloroform, the nitroso aciddimer melted to a blue liquid at 105°–106°C.

Anal. Calcd for $C_{12}H_{22}N_2O_6$:
  C, 49.7; H, 7.6; N, 9.6; neut. eq., 145.2
Found: C, 50.0; H, 7.8; N, 9.5; neut. eq., 145.9, 145.2.

Dissolution of the colorless crystals of the nitroso acid dimer in ethanol (1.06 g/liter) gave a blue solution having an absorption maximum at 684 nm (typical of dissociated aliphatic nitroso compounds) and showing only very weak absorption at 285 nm, the frequency at which aliphatic nitroso dimers show strong absorption. Thus, in dilute solution in ethanol, the colorless dimer of 4-nitroso-4-methylvaleric acid is almost wholly dissociated into blue 4-nitroso-4-methylvaleric acid.

B. 1,6-Hexamethylene-bis(4-nitroso-4-methylvaleramide)

$$n(ONC(CH_3)_2CH_2CH_2CONH(CH_2)_6NHCOCH_2CH_2C(CH_3)_2NO)$$
$$\downarrow \uparrow$$
$$(ONC(CH_3)_2CH_2CH_2CONH(CH_2)_6NHCOCH_2CH_2C(CH_3)_2NO)_n$$

wherein $n$ is at least 2.

The dimer of the 4-nitroso-4-methyvaleric acid (1.45 g) of Part A was dissolved in 10 ml of dry 1,2-dimethoxyethane to give a bright blue solution. The solution was cooled to 0°C before adding 1.1 ml of dry N-methylmorpholine followed by 1.33 ml of isobutyl chloroformate and 10 ml of a solution of 1.16 g of hexamethylenediamine in 20 ml of dry 1,2-dimethoxyethane. The mixture was then allowed to stand at room temperature overnight. About 50 ml each of water and methylene chloride was added. A solid product, not soluble in either the aqueous or the organic layer, was collected, washed in turn with methylene chloride and water and then dried to give 1 g of a pale blue solid which was the nitroso dimer polymer of 1,6-hexamethylene-bis(4-nitroso-4-methyvaleramide). At 115°–118°C the nitroso dimer linkages disssociated, thus converting the polymer to the bright blue fluid, 1,6-hexamethylene-bis(4nitroso-4-methylvaleramide). When allowed to cool again to room temperature, the blue color faded (as the nitroso groups dimerized) to yield a hard, somewhat tacky resin which was the nitroso dimer polymer of the bis-amide.

Anal. Calcd for $C_{18}H_{34}O_4N_4$: C, 58.3; H, 9.3; N, 15.1
Found: C, 57.2; H, 9.8; N, 14.6.

C. The Tris(4-nitroso-4-methyvaleramide) of Diethylenetriamine wherein $n$ is at least 2.

To a solution of 2.90 g of the nitroso acid of Part A in 20 ml of dry 1,2-dimethoxyethane at 0°C was added 2.2 ml of dry N-methylmorpholine followed by 2.66 ml of isobutyl chloroformate and 0.61 ml of freshly distilled bis(2-aminoethyl)amine. The mixture was allowed to stand at room temperature overnight. Addition of about 50 ml each of water and methylene chloride gave a deep blue, organic layer and a nearly colorless aqueous layer. The organic layer was separated, washed with water, dilute sulfuric acid, aqueous sodium bicarbonate and finally again with water and then dried over magnesium sulfate. Evaporation of the methylene chloride left 2.6 g of blue oil. A 1-g portion of the oil in methylene chloride was chromatographed through a 1.5 × 20 inch column of Brinkmman Silica Gel (30–70 mesh). Upon development of the chromatography successively with methylene chloride, methylene chloride/ethyl acetate mixtures, ethyl acetate and finally with 1/1 ethyl acetate/methanol, the eluate became intensely blue. Evaporation of the solvent from the blue ethyl acetate/methanol portion left about 0.5 g of the nearly colorless, hard tris(4-nitroso-4-methylvaleramide) of bis(2-aminoethyl)amine as a material highly crosslinked by virtue of nitroso dimer linkages between the tris-amide molecules. At 90°–100°C the pale-colored solid immediately became an intensely blue, fluid liquid. At this temperature the nitroso dimer couplings were dissociated thermally into monomeric nitroso groups to give the monomeric tris-nitrosoamide having a molecular weight of 448. Immediately upon cooling to room temperature, the blue color of the monomeric nitroso groups disappeared and the tris-nitrosoamide became a highly coupled polymer of high molecular weight as intermolecular nitroso dimer groups reformed.

Anal. Calcd. for $C_{19}H_{40}N_6O_6$: C, 50.9; H, 9.0
Found: C, 50.7; H, 8.3.

EXAMPLE 22

Two grams of an ethylene/propylene/1,4-hexaadiene (64/32/4 by weight) terpolymer, one part of an isobutylene/isoprene copolymer containing a few percent of isoprene, and three parts of a fast extrusion furnace carbon black were blended together on a rubber mill, and 5 × 0.25 × 0.08 inch bars molded at 160°c/20,000 lb pressure for 5 minutes. Two of these bars were immersed for 30 minutes in a solution of 10.6 g of NOCl in 150 ml of methylene chloride in a glass vessel at 1 atmosphere pressure for 30 minutes. A third bar was given a similar immersion in the NOCl solution for 40 minutes. The following table describes the tensile/elongation and modulus properties for these bars in comparison with a control bar that did not receive any NOCl treatment.

$$2n((ON-C(CH_3)_2CH_2CH_2CONHCH_2CH_2)_2NCOCH_2CH_2C(CH_3)_2NO)$$

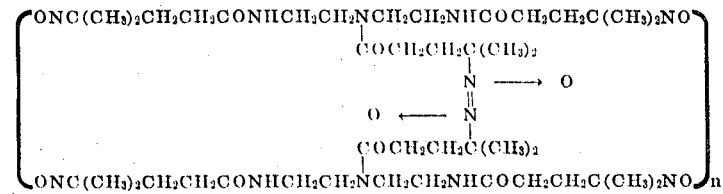

| Exposure to NOCl Soln. | $T_B$,psi | $E_B$,% | Physical Test Data $M_{100}$,psi | $M_{200}$,psi | $M_{300}$,psi |
|---|---|---|---|---|---|
| None[1] | 166 | 133 | 145 | — | — |
| 30 Minutes[2] | 1749 | 308 | 609 | 1288 | 1695 |
| 30 Minutes[2] | 1431 | 310 | 570 | 1146 | 1550 |
| 40 Minutes[2] | 1772 | 296 | 601 | 1268 | 1771 |

[1]. Average of 4 determinations.
[2]. Average of 2 determinations. When $E_B$ <300, value for $M_{300}$ taken as that for determination with $T_B$ >300.

EXAMPLE 23
Preparation of Poly-2,7-dinitroso-2,7-dimethyloctane

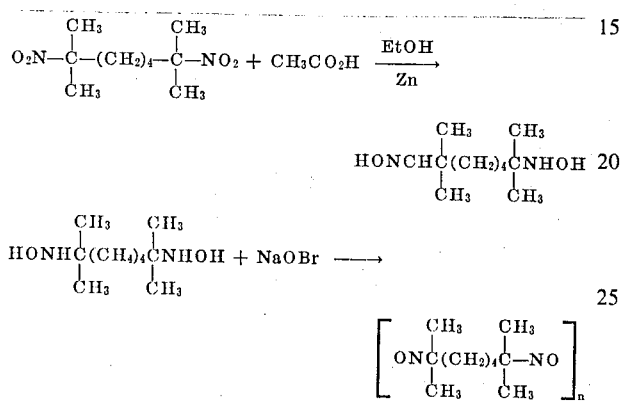

a. Preparation of 2,7-Dihydroxylamino-2,7-dimethyloctane

To a stirred and cooled (15°C) mixture of 50 g of 2,7-dinitro-2,7-dimethyloctane, [Sharkey and Langkammerer, Organic Synthesis, Vol. 41, p. 24 (1962)], 175 ml of 2B alcohol, and 125 ml of glacial acetic acid contained in a 500-ml flask fitted with a mechanical stirrer, a reflux condenser, a thermometer, a nitrogen bubbler and an ice-water bath, was added 56 g of zinc dust in small portions during 1 hour and 35 minutes. The mixture was stirred for 1 hour, and then during 35 minutes the temperature was raised to 50°–55°C. Stirring was continued until the temperature returned to room temperature. the solid was removed by filtration, rinsed on the filter with 2B alcohol and then dried under nitrogen, wt. = 112.15 g.

The filtrate was evacuated at full water pump vacuum to remove the alcohol. The resulting syrupy residue was diluted with 100 ml of water, placed in a continuous liquid-liquid extractor, and extracted with ether overnight. The next day, both the ther and the aqueous fractions contained solid. Filtration of the ether gave 2.98 g of the bis-acetic acid salt of 2,7-dihydroxylamino-2,7-dimethyloctane, mp 122°–123°C. Filtration of the aqueous portion gave 22.0 g of the same salt, mp 120°–121°C. Evaporation of the ether gave 10.51 g of a mixture of solid and liquid which probably consisted of the bis-acetic acid salt and acetic acid.

The aqueous filtrate was re-extracted with ether for three days and again both the aqueous and ether fractions contained solid. From the ether fraction there was obtained 7.67 g of material melting at 131°–132°C, which was impure dihydroxylamine. The solid in the aqueous portion weighed 3.74 g and melted at 128°–131°C, with some material unmelted. This last fraction presumably contained dihydroxylamine but also some inorganic material, e.g., basic zinc salts. The overal yield of dihydroxylamine and salts in this experiment was about 50–55%.

The highest melting samples of the bis-acetic acid salt melted at 121.5°–123.5°C. Analysis was obtained on a similarly prepared sample.

Anal. Calcd. for $C_{14}H_{32}N_2O_6$: C, 51.9; H, 9.9; N, 8.6
Found: C, 52.0; H, 9.7; N, 8.7.

The bis-acetic acid salt is easily converted to the dihydroxylamine: 21.87 g of the salt was mixed with 300 ml of distilled water and the resulting mixture filtered to remove a little undissolved material. Aqueous NaOH solution was added to the filtrate until no further precipitation occurred. The resulting crystalline solid was filtered, rinsed on the filter with water, dried on the filter under nitrogen and eventually in vacuo, wt = 12.81 g (93 percent), mp 143°–144°C. Analysis was obtained on a similarly prepared sample.

Anal. Calcd for $C_{10}H_{24}N_2O_2$: C, 58.7; H, 11.8; N, 13.7
Found: C, 58.5; H, 12.0; N, 14.0.

The dihydroxylamine is apparently quite pure as obtained. It can be recrystallized from 2B alcohol or methanol. It is not appreciably soluble in acetone, water, absolute ethanol, benzene or ethyl acetate. It is much more soluble in aqueous acetone or ethanol.

b. Conversion of 2,7-Dihydroxylamino-2,7-dimethyloctane to 2,7-Dinitroso-2,7-dimethyloctane Into a 500-ml flask fitted with a mechanical stirrer, a reflux condenser, a dropping funnel, a thermometer and a nitrogen bubbler was placed 8.0 g of 2,7-dihydroxylamino-2,7-dimethyloctane and 150 ml of methylene chloride. The mixture was cooled to −5°C and then with viggorous stirring, 80 ml of a freshly prepared sodium hypobromite solution (prepared by dissolving 12.0 g of sodium hydroxide in about 50 ml of distilled water, adding 19.3 g of $Br_2$ and diluting the solution to 100 ml) was added druing 7 minutes. After an additional 18 minutes of stirring no hypobromite color remained in the aqueous layer, and the methylene chloride layer was an intense blue. Stirring was continued for another 20 minutes and then the layers were separated. The organic layer was washed twice with 100 ml of water, evaporated on the water pump to remove the solvent, and the residue was dried on the oil pump. The resulting pale blue solid melted to a deep blue liquid at 87°–92°C with softening at 84.5°C. Distillation of this material (as a blue vapor, bp 64°C/0.5 mm –66°C/0.4 mm) through a small Vigreux still gave a viscous, blue liquid which on cooling in an ice bath, slowly solidified to a hard pale blue cake, wt. = 5.55 g (71 percent), of 2,7-dinitroso-2,7-dimethyloctane.

| Anal. Calcd for $C_{10}H_{20}N_2O_2$: | C, 60.0; | H, 10.1; | N, 14.0 |
|---|---|---|---|
| Found: | C, 59.9; | H, 9.6; | N, 14.1 |
|  | 60.0 | 9.9 | 14.1. |

The UV spectrum (EtOH), obtained on a similarly prepared sample, contains two peaks at 683nm (k = 0.187, ε = 37.4, nitroso monomer) and 293nm (k = 0.381, ε = 76, nitroso dimer). With such a low extinction coefficient for the peak at 293nm, it appears that at the dilute conditions of this measurement the compound is almost completely dissociated.

The IR spectrum (KBr), obtained on a similarly prepared sample, contains weak bands at 6.42 and 6.49 μ indicative of monomeric nitroso functionality, In $CCl_4$ solution, a strong band at 6.42 μ (nitroso monomer) is apparent. The mass spectrogram contains as the highest mass ion an intense peak at 170.16, which corresponds to the parent compound (M) minus an NO group. Other ions at m/e 155 — [M —($CH_3$ + NO)], 128 — [M —$C(CH_3)_2NO$] and 114 — [M -$CH_2C(CH_3)_2NO$] are all consistent with the assigned structure.

A smaple of this material, when heated on a spatula or a gradient block to about 100°–120°C, melts to a deep blue puddle. As it cools, it first becomes waxy and then slowly hardens to a brittle solid.

EXAMPLE 24

Preparation of Dimeric 4-Nitroso-3,5-dichlorobenzoyl chloride

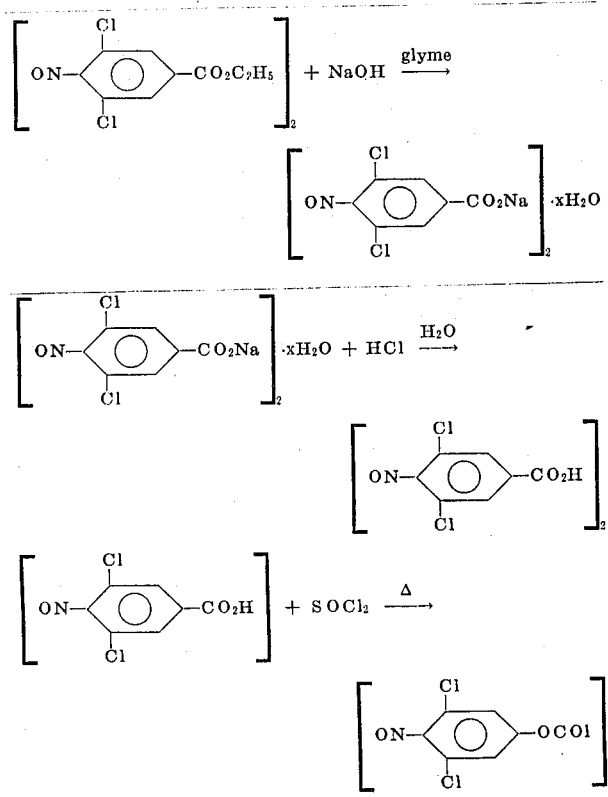

A. Preparation of Dimeric Sodium 4-Nitroso-3,5-dichlorobenzoate

A mixture of 40 g of dimeric ethyl 4-nitroso-3,5-dichlorobenzoate, 400 ml of 1,2-dimethoxyethane (glyme) and a solution of 6.8 g of sodium hydroxide in 28 ml of water was stirred at room temperature for a short time. The mixture was heated to 50°C during 15 minutes and then kept at 50°–55°C for 1 hour. After an additional 2 hours of stirring at room temperature, the mixture was filtered, the solid was rinsed on the filter with glyme, dried under nitrogen, and finally dried in vacuo. There was thus obtained 33.25 g (79 percent) of sodium 4-nitroso-3,5-dichlorobenzoate dimer hydrate as a free-flowing yellow nonhygroscopic but water-soluble solid. The analysis indicated that each molecule of dimer contained three molecules of water.

| Anal. Calcd. for $C_{14}H_{21}N_2Na_2O_6 \cdot 3H_2O$: | | | |
|---|---|---|---|
| | C, 31.3; H, 1.9; | Cl, 26.3; | N, 5.2 |
| Found: | C, 31.7; H, 2.0; | Cl, 25.7; | N, 5.0 |
| | 31.9 1.9 | 25.8 | 5.0 |

B. Preparation of Dimeric 4-Nitroso-3,5-dichlorobenzoic Acid

A 6.6 g sample of sodium 4-nitroso-3,5-dichlorobenzoate dimer hydrate was stirred with 150 ml of distilled water and the resulting mixture was filtered with the aid of "Celite" filter aid. Acidification of the filtrate with concentrated hydrochloric acid gave the dimer of 4-nitroso-3,5-dichlorobenzoic acid as a yellow solid, which was filtered, rinsed on the filter with water, dried under nitrogen, and finally dried in vacuo, wt 4.20 g (78 percent).

| Anal. Calcd. for $(C_7H_3Cl_2NO_3)_2$: | |
|---|---|
| C, 38.2; H, 1.4; Cl, 32.2; N, 6.4 | |
| Found: C, 38.2; H, 1.4; Cl, 31.5; N, 6.3. | |

C. Conversion of Dimeric 4-Nitroso-3,5-dichlorobenzoic Acid to the Acid Chloride A mixture of 100 ml of thionyl chloride and 12.07 g of dimeric 4-nitroso-3,4-dichlorobenzoic acid was refluxed for 12 hours. During the last 2 or 3 hours of the reflux period, the mixture appeared to be homogeneous. The solution was subjected to water pump distillation to remove the excess thionyl chloride. The dark brown residue was dried at water pump vacuum, wt. 12.96 g (99 percent), mp 157°–158°C.

The crude product obtained in this fashion was purified by being stirred with glyme (2ml/g) for 0.5 to 1 hour at room temperature. The insoluble material was filtered, rinsed twice on the filter with small portions of glyme, dried first under nitrogen and finally in vacuo. The almost colorless product (85 percent recovery) melted at 162°–163°C. Recrystallization from benzene did not raise the melting point. This material was identical with samples prepared from reaction of the sodium salt with thionyl chloride, which had the following analysis:

Anal. Calcd. for (C₇H₂Cl₃NO₂)₂: C, 35.2; H, 0.9; Cl, 44.6
Found: C, 35.4; H, 1.3; Cl, 43.6

Part D
Preparation of

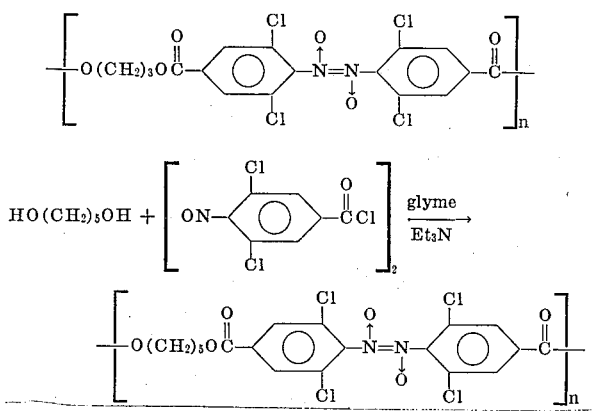

A mixture of 5.0 g of dimeric 4-nitroso-3,5-dichlorobenzoyl chloride, prepared as described in Parts A–C, 1.09 g of distilled pentane-1,5-diol and 50 ml of glyme, was cooled to 0°C in a flask fitted with a mechanical stirrer, a reflux condenser and a nitrogen bubbler. To this mixture was added 2.12 g of triethylamine in 20 ml of glyme. The mixture was stirred and allowed to warm to room temperature. After 1 hour and 20 minutes, 100 ml of glyme was added to the mixture and stirring continued. The mixture was heated to 50°C for a short time and then allowed to cool to room temperature. The green reaction mixture was then poured into 600 ml of water and the resulting solid filtered, rinsed on the filter with water, dried first under nitrogen and then in a vacuum. There was thus obtained 4.10 g (77 percent) of colorless nitroso dimer polymer, mp 155°–160°C.

Anal. Calcd for (C₁₉H₁₄Cl₄N₂O₆)ₙ:
C, 45.0; H, 2.8; Cl, 27.8; N, 5.5
Found:   C, 44.9;   H, 2.8;   Cl, 27.8;   N, 5.6
         44.6       2.9       27.8       5.5
         45.1       2.9                  5.5.

The infrared spectrum shows the absence of OH and COCl groups. A brittle, self-supporting transparent film was pressed at 120°C.

In a similar fashion, nitroso dimer polymers were also prepared from ethylene glycol, 1,4-butanediol and 1,10-decanediol.

EXAMPLE 25

Preparation of a Polyester from Tetramethylene Glycol, Terephthaloyl Chloride, and Glycerol

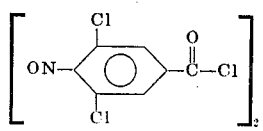

A solution of 12.80 g of terephthaloyl chloride, 3.00 g of dimeric 4-nitroso-3,5-dichlorobenzoyl chloride, 5.62 g of tetramethylene glycol and 0.42 g of glycerol in 300 ml of glyme was cooled to −5°C and then 11.4 ml of pyridine in 50 ml of glyme was added. The mixture was allowed to warm to room temperature and then stirred for 3 days. The mixture was processed as described in Example 26 and the isolated polymer was finally washed twice with water in a Waring blender. After drying, the white nitroso dimer polymer weighed 15.8 g (94 percent) and melted at ~165°C. Anal. Calcd.: C, 61.2; H, 4.8; Cl, 5.3
Found: C, 60.1; H, 4.9; Cl, 6.2
        60.0   4.8   6.1.

The polymer could be pressed to brittle opaque films at 150°c. The infrared spectrum shows the absence of OH and COCl groups.

In a similar way a polyester containing adipic acid groups is obtained by replacement of all or a part of the terephthaloyl chloride by adipoyl chloride.

EXAMPLE 26

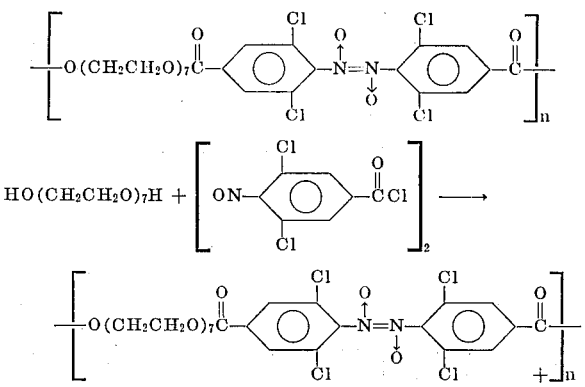

To a solution of 5.00 g of dimeric 4-nitroso-3,5-dichlorobenzoyl chloride, 3.33 g of heptaethylene glycol and 300 ml of glyme was added a solution of 2.0 ml of pyridine in 20 ml of glyme as described in Example 24D. The mixture was processed as described in Example 25 and there was thus obtained 6.3 g (82 percent) of a tough flexible pale green nitroso dimer polymer which forms a green mobile liquid at 130°C.

Anal. Calcd. for C₂₈H₃₂Cl₄N₂O₁₂:   C, 46.1;   H, 4.4;   Cl, 19.4
                          Found:   C, 46.2;   H, 4.2;   Cl, 19.0
                                   46.4       4.4       19.3.

The infrared spectrum shows the absence of COCl groups and the presence of a small amount of OH, probably caused by water.

Polymers were similarly prepared from HO(CH₂CH₂O)₂H, HO(CH₂CH₂O)₄H, and a polyethylene glycol with a molecular weight of ~1,540, i.e., HO(CH₂CH₂O)ₙH (Carbowax 1540, Union Carbide Corporation).

EXAMPLE 27

Preparation of a Polyester from Tetraethylene Glycol (HO(CH$_2$CH$_2$O)$_4$H), Terephthaloyl Chloride, and

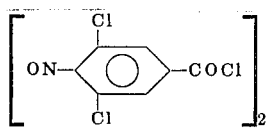

To a solution of 6.40 g of terephthaloyl chloride, 3.00 g of the dimer of 4-nitroso-3,5-dichlorobenzoyl chloride, and 7.34 g of tetraethylene glycol in 200 ml of glyme was added 6.3 ml of pyridine in 30 ml of glyme as described in Example 24D. After processing as described in Example 25, there was obtained 10.30 g (74 percent) of a greenish-yellow viscous soft nitroso dimer polymer.

| Anal. Calcd.: | C, 55.2; | H, 5.5; | Cl, 6.4 |
|---|---|---|---|
| Found: | C, 54.8; | H, 5.6; | Cl, 6.6 |
|  | 54.9 | 5.6 | 6.6. |

EXAMPLE 28

Preparation of

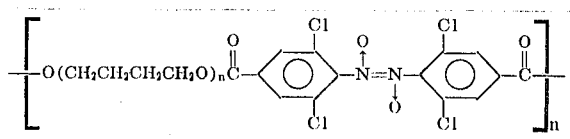

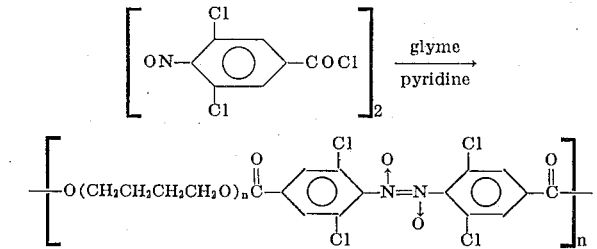

To a stirred solution of 25.15 g of "Polyglycol-3,000" (i.e., a polytetramethylene glycol with average molecular weight of 3,000), 4.00 g of dimeric 4-nitroso-3,5-dichlorobenzoyl chloride and 300 ml of glyme at 45°C was added 1.40 ml of pyridine in 20 ml of glyme as described in Example 24D. The polymer was processed as described in Example 25, except that a mixture of ice and water was used. A total of 24.8 g (87 percent) of a tan waxy somewhat tough nitroso dimer polymer was obtained, mp <65°C.

| Anal. Calcd.: | C, 63.3; | H, 9.9; | Cl, 4.2 |
|---|---|---|---|
| Found: | C, 63.5; | H, 9.6; | Cl, 3.9 |
|  | 63.2 | 9.8 | 3.9. |

The infrared spectrum shows the absence of COCl groups, and the presence of a small amount of OH, probably H$_2$O.

EXAMPLE 29

Preparation of a Polyester from "Polyglycol-3,000," Terephthaloyl Chloride, and

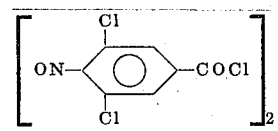

To a solution of 20 g of "Polyglycol-3,000," 1.22 g of terephthaloyl chloride and 0.32 g of the dimer of 4-nitroso-3,5-dichlorobenzoyl chloride in 300 ml of glyme was added 1.2 ml of pyridine in 20 ml of glyme as described in Example 24D. After a work up as described in Example 28, there was obtained 16.7 g (75 percent) of yellow polymer melting at 36–38°C.

| Anal. Calcd.: | C, 66.0; | H, 10.7; | Cl, 0.5 |
|---|---|---|---|
| Found: | C, 65.0; | H, 10.4; | Cl, 0.5 |
|  | 65.5 | 10.5 | 0.4 |
|  | 65.7 | 10.6 |  |

The infrared spectrum showed the absence of OH and COCl groups.

EXAMPLE 30

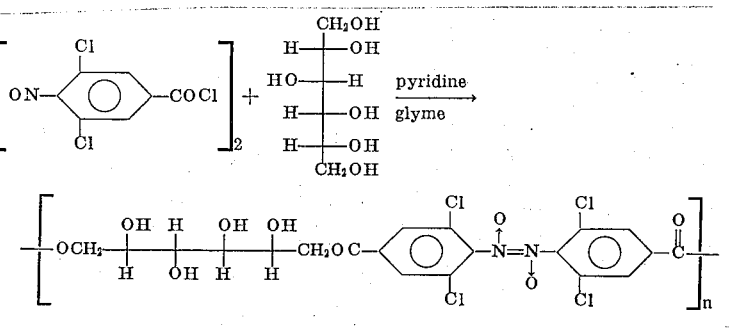

To a solution of 1.91 g of sorbitol in 200 ml of pyridine contained in a Waring blender was added 5.00 g of the dimer of 4-nitroso-3,5-dichlorobenzoyl chloride in 200 ml of glyme. The mixture was stirred in the blender for 5 minutes, 500 ml of water was added, and stirring was continued. The resulting sticky nitroso dimer polymer was isolated, washed in the blender several times with water and dried in a vacuum oven at 40°C, wt = 2.32 g (38 percent). The polymer is a hard solid which forms a viscous liquid at 160°C.

Anal. Calcd. for $C_{20}H_{16}Cl_4N_2O_{10}$:
  C, 41.0;  H, 2.8;  Cl, 24.2;  N, 4.8
Found:  C, 41.2;  H, 2.5;  Cl, 24.9;  N, 5.0
  41.3  2.5  25.0  5.1.

EXAMPLE 31

Coupling of a Partially Hydrolyzed Ethylene-Vinyl Acetate Copolymer

A mixture of 5.00 g of a partially hydrolyzed ethylene-vinyl acetate copolymer, 0.18 g of the dimer of 4-nitroso-3,5-dichlorobenzoyl chloride, 0.08 ml of pyridine and 200 ml of chloroform was heated under an atmosphere of nitrogen to 40°C to obtain a homogeneous solution and the solution was stirred for 2 days in the dark. It was mixed in a blender with 400 ml of methanol, and the resulting solid polymer was washed three times with 400 ml of water in the blender and dried at 40°C in a vacuum oven, wt. 4.75 g of nitroso dimer polymer. The polymer softened at 100°C without melting.

EXAMPLE 32

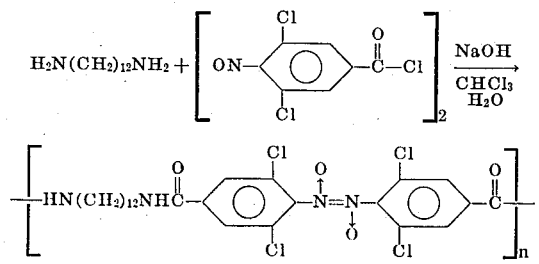

A mixture of 2.10 g of 1,12-diaminododecane, 0.84 g of sodium hydroxide, 20 ml of chloroform and 100 ml of distilled water was placed in a blender. With rapid stirring, a solution of 5.0 g of the dimer of 4-nitroso-3,5-dichlorobenzoyl chloride in 100 ml of chloroform was added. After an addditional 5 minutes of stirring, 500 ml of methanol was added and the resulting precipitate was washed in the blender several times with water and then dried in vacuum, wt. 5.29 g (84 percent) of nitroso dimer polymer, mp about 200°C.

Anal. Calcd. for $(C_{28}H_{36}Cl_4N_4O_4)_n$:
  C, 51.8;  H, 5.0;  Cl, 23.4;  N, 9.3
Found:  C, 51.4;  H, 5.1;  Cl, 22.8;  N, 9.1
  51.3  5.2  23.1  8.9.

EXAMPLE 33

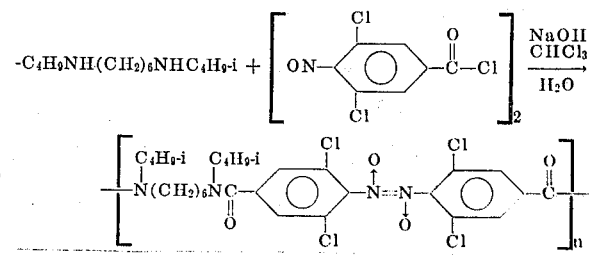

A mixture of 2.39 g of N,N'-diisobutylhexamethylenediamine, 10 ml of chloroform, 0.84 g of sodium hydroxide and 100 ml of distilled water was placed in a blender. With rapid stirring, a solution of 5.00 g of the dimer of 4-nitroso-3,5-dichlorobenzoyl chloride in 100 ml of chloroform was added. Stirring was continued for 5 minutes. At the end of this time, the reaction mixture consisted of a green chloroform layer and a colorless aqueous layer. The chloroform layer was separated and evaporated in vacuo. The resulting polymer was washed twice with water in the blender and then dried at 40°C in vacuum. There was thus obtained 5.98 g (90 percent) of nitroso dimer polymer, obtained as a pale green powder which melted to a green fluid at 130°C.

Anal. Calcd. for $C_{28}H_{34}Cl_4N_4O_4$:
  C, 53.2; H, 5.4; Cl, 22.4; N, 8.9
Found:  C, 51.2; H, 5.3; Cl, 25.6; H, 8.3.

EXAMPLE 34

Preparation of a Polyamide with the Average Structure

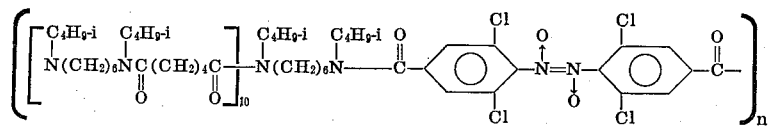

A mixture of 11.00 g of N,N'-di(isobutyl)hexamethylenediamine, 3.86 g of sodium hydroxide, 40 ml of chloroform and 200 ml of distilled water was placed in a blender. With rapid stirring a solution of 8.01 g of adipoyl chloride was added in 150 ml of chloroform, followed 3 minutes later by a solution of 2.05 g of the dimer of 4-nitroso-3,5-dichlorobenzoyl chloride in 100 ml of chloroform. The polymer was processed as described in Example 33 to give 14.12 g (82 percent) of a tough cream-colored elastomeric nitroso dimer polymer which melted to a green liquid at 130°C.

Anal. Calcd.:  C, 68.0;  H, 10.4;  Cl, 3.5;  N, 8.4
Found:  C, 66.6;  H, 10.3;  Cl, 4.5;  N, 7.7.

EXAMPLE 35

Preparation of a Polyamide with the Average Structure

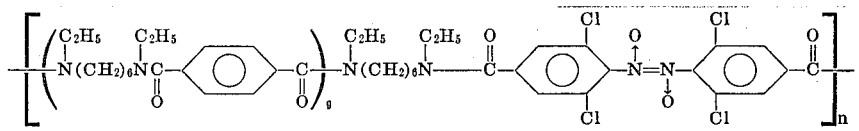

In a blender was mixed 7.06 g of N,N′-diethylhexamethylenediamine, 200 ml of distilled water, 40 ml of chloroform, and 3.35 g of sodium hydroxide. With rapid stirring was added 7.49 g of terephthaloyl chloride in 200 ml of chloroform, followed in 3 minutes by a solution of 1.96 g of the dimer of 4-nitroso-3,5-dichlorobenzoyl chloride in 100 ml of chloroform. The polymer was processed as described in Example 33 to give 14.4 g of pale yellow somewhat tough nitroso dimer polymer which formed a clear viscous melt at 180°C. Translucent tough films could be pressed at 50°C, 2,000 lbs pressure.

EXAMPLE 36

Preparation of a Polyamide with the Average Structure

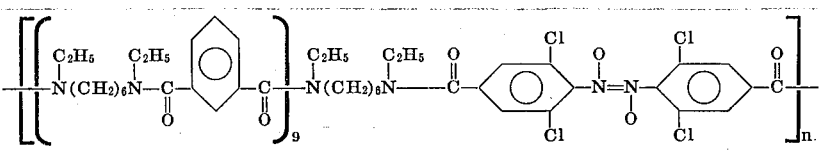

From the process described in Example 35, but substituting 7.49 g of isophthaloyl chloride for terephthaloyl chloride, there was obtained 13.2 g of a soft tan flexible polymer which formed a viscous melt at 110°C.

EXAMPLE 37

Preparation of a Polyamide from N,N′-Diethylhexamethylenediamine, Adipyl Chloride, Terephthaloyl Chloride and

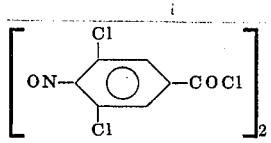

In a blender was mixed 10.00 g of N,N′-diethylhexamethylenediamine, 4.70 g of sodium hydroxide, 200 ml of water, and 40 ml of chloroform. With rapid stirring was added a solution of 1.93 g of adipoyl chloride and 8.56 g of terephthaloyl chloride in 200 ml of chloroform, followed in 5 minutes by a solution of 2.52 g of the dimer of 4-nitroso-3,5-dichlorobenzoyl chloride in 150 ml of chloroform. After an additional 5 minutes, the layers had not separated so the whole mixture was evaporated in vacuo to remove the chloroform. The resulting precipitated polymer was washed twice with water and dried to give 20.0 g of a light tan tough rather hard nitroso dimer polymer which formed a viscous melt at 140°C.

EXAMPLE 38

Preparation of a Polyamide from N,N′-Diethylhexamethylenediamine, Hexamethylenediamine, Adipoyl Chloride and

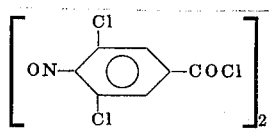

In a blender was mixed 8.00 g of N,N′-diethylhexamethylenediamine, 1.35 g of hexamethylenediamine, 200 ml of water, 40 ml of chloroform, and 4.64 g of sodium hydroxide. With rapid stirring was added a solution of 8.83 g of adipoyl choride in 150 ml of chloroform, followed in 30 minutes by a solution of 4.71 g of the dimer of 4-nitroso-3,5-dichlorobenzoyl chloride in 100 ml of chloroform. The polymer was processed as described in Example 37, to give 15.5 g (82 percent) of a yellow tough somewhat flexible nitroso dimer polymer which formed a viscous melt at 160°C. At 44°C and 4,000 lbs a tough flexible opaque film could be pressed.

EXAMPLE 39

Preparation of a Polyamide with the Average Structure

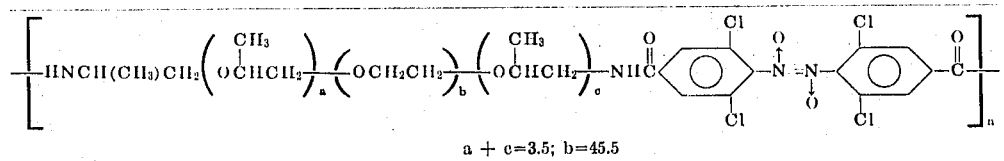

a + c = 3.5; b = 45.5

In a blender was mixed 20.00 g of Jeffamine 2001, 0.71 g of NaOH and 200 ml of water.
[Jeffamine-2001 is a product of Jefferson Chemical Corp. and has the following average composition:

$$H_2NCH(CH_3)CH_2\left(OCHCH_2\atop CH_3\right)_a(OCH_2CH_2)_b\left(OCHCH_2\atop CH_3\right)_cNH_2$$

a + c = 3.5; b = 45.5.]

With rapid stirring was added 4.18 g of the dimer of 4-nitroso-3,5-dichlorobenzoyl chloride in 200 ml of chloroform. After the mixture was stirred for 5 minutes, it was processed as described in Example 33. The resulting nitroso dimer polymer weighed 24.0 g and was a waxy pale green solid which formed a viscous green melt at 65°C.

| Anal. Calcd.: | C, 53.0; | H, 8.1; | Cl, 5.3; | N, 2.1 |
|---|---|---|---|---|
| Found: | C, 53.1; | H, 8.3; | Cl, 5.3; | N, 2.1 |
| | 53.0 | 8.1 | 5.6 | 2.2 |

EXAMPLE 40

Part A
Preparation of Dimeric 2-Hydroxyethyl 4-Nitroso-3,5-dichlorobenzoate

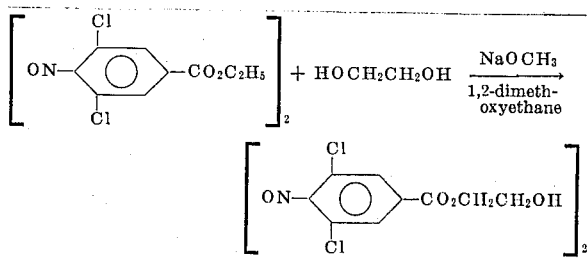

A mixture of 20 g of the dimer of ethyl 4-nitroso-3,5-dichlorobenzoate, [Holmes, R. R., and Bayer, R. P., J. Am. Chem. Soc. 82, 3454 (1960)], 200 ml of ethylene glycol, 200 ml of glyme and 1.0 g of sodium methoxide was stirred under nitrogen at room temperature for 3 hours. The mixture was filtered to remove some unreacted starting material (4.40 g, 22 percent) and then poured into a large excess of water. The resulting precipitate was filtered, rinsed on the filter with water, dried under nitrogen and then in vacuo. There was then obtained 11.02 g of crude dimeric 2-hydroxyethyl 4-nitroso-3,5-dichlorobenzoate melting at 159°–162°C. Recrystallization from acetone raised the melting point to 165°–165°C (green melt).

Anal. Calcd. for $(C_9H_7Cl_2NO_4)_2$: C, 40.9; H, 2.7; Cl, 26.8
Found: C, 41.3; H, 2.7; Cl, 26.4.

Part B

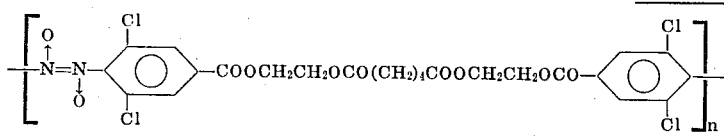

The 2-hydroxyethyl ester of 4-nitroso-3,5-dichlorobenzoic acid, prepared as described in Part A (0.01 mole), was dissolved in 50 ml of dry 1,2-dimethoxyethane. The solution was cooled to 0°C with some reprecipitation of the reactant. At this temperature was added adipoyl chloride (0.005 mole), followed by pyridine (0.01 mole). After 1 hour at 0°C, the mixture was stirred overnight at room temperature at which time it consisted of a white solid and a green supernatant solution. Addition of a little water caused the solid to dissolve. Upon further dilution with water, a pasty solid separated. The precipitate was washed repeatedly with water and dried.

The nitroso dimer polymer so obtained was a friable solid which could be ground to a powder. At 120°C it became a green liquid of low viscosity. At this temperature the nitroso dimer linkages are essentially all dissociated, and this bis-adipate is present predominantly as "monomer." Upon cooling to room temperature, the green color of the free nitroso groups (—N=O) fades as nitroso dimer

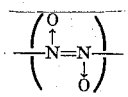

forms to regenerate polymer from the monomer. The resulting polymer is a hard, glassy solid at room temperature. This thermal transformation from polymer to monomer, back to polymer is repeatedly reversible.

Anal. Calcd. for $C_{14}H_{20}Cl_4N_2O_{10}$:
C, 45.2; H, 3.2; N, 4.4; Cl, 22.2
Found: C, 45.2; H, 3.3; N, 4.3; Cl, 21.9.

EXAMPLE 41

Preparation of a Polyester with the Average Structure

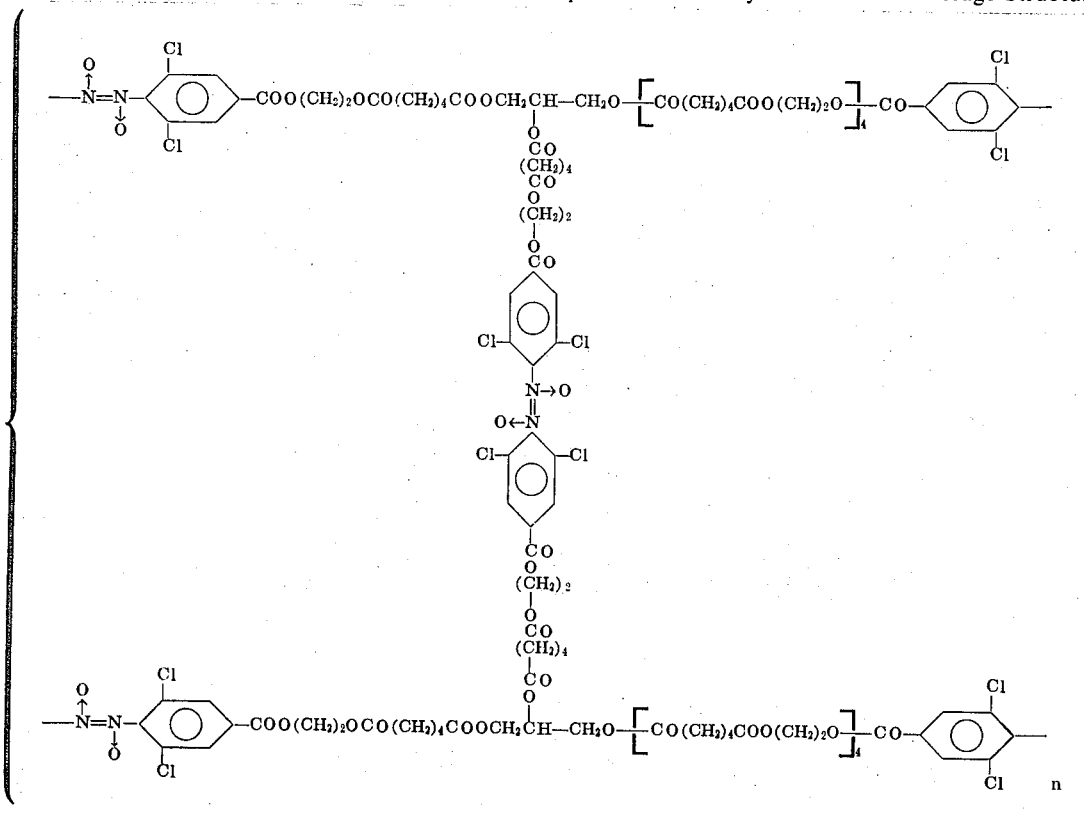

A solution of the 2-hydroxyethyl ester of 4-nitroso-3,5-dichlorobenzoic acid (8.516 g, 0.03 mole), ethylene glycol (1.862 g, 0.03 mole) and glycerol (0.921 g, 0.01 mole) in 125 ml of dry 1,2-dimethoxyethane was cooled to +5°C. Adipyl chloride (8.90 ml, 0.06 mole), followed by dry pyridine (9.72 ml, 0.12 mole) was added. After standing overnight at room temperature, the mixture was poured into one liter of water to precipitate a viscous nitroso dimer polymer. It was washed by mulling with more water and then dried. At 110°C the polymer was a green fluid. Upon recooling to room temperature, the green color disappeared as the dissociated nitroso groups dimerized to leave a gum with useful adhesive properties.

Anal. Calcd. for $C_{72}H_{83}O_{33}Cl_6N_3$:
　　　　C, 50.0; H, 4.8; N, 2.4; Cl, 12.9
Found:　C, 49.7; H, 4.7; N, 2.5; Cl, 12.7.

EXAMPLE 42

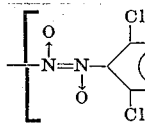—COO(CH$_2$)$_2$OCONH(CH$_2$)$_6$NHCOO(CH$_2$)$_2$OCO—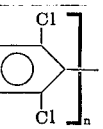

To 10 ml of dry dimethylformamide was added hexamethylene diisocyanate (1.6 ml, 0.02 eq.) and the 2-hydroxyethyl ester of 4-nitroso-3,5-dichlorobenzoic acid (5.0 g, 0.02 eq.) to give a clean green solution to which was added a small drop of dibutyl tin dilaurate. On standing overnight at room temperature, the green mixture became viscous. The solution was poured into water and the solid nitroso dimer polymer which separated was washed thoroughly with water in a blender and allowed to air-dry (6.5 g).

Anal. Calcd. for $C_{26}H_{26}N_4Cl_4O_{10}$:
　　　　C, 44.9; H, 3.8; N, 8.0; Cl, 20.4
Found:　C, 44.9; H, 3.8; N, 7.9; Cl, 20.4.

The solid product was amorphous by x-ray diffraction. It became a sticky, green paste at 90°C and a green fluid at 130°C. when melted quickly at 130°C and cooled to room temperature, the green color disappeared at once and the liquid quickly set to a hard glass.

EXAMPLE 43

Desmodur N (Mobay Chemical Co.) is a solution of a triisocyanato-biuret derived from 3 moles of hexamethylenediisocyanate and 2 moles of water. It has the structure:

OCN +CH$_2$)$_6$N[CONH(CH$_2$)$_6$NCO]$_2$

To a solution of Desmodur N and the 2-hydroxyethyl ester of 4-nitroso-3,5-dichlorobenzoic acid (0.02 eq. each) in 10 ml of dry dimethylformamide (DMF) was added a small amount of dibutyl tin dilaurate. The clear green solution became a gel in about 30 minutes at room temperature. After standing overnight at room temperature, the hard gel was broken up into water and the solid washed thoroughly with water in a blender. The air-dried solid nitroso dimer polymer (9.5 g) was soluble in hot DMF to give a green solution which set to a gel at room temperature.

Anal. Calcd. for $C_{50}H_{58}N_9Cl_6O_{17}$:
　　　　C, 47.3; H, 4.7; N, 9.9; Cl, 16.7
Found:　C, 48.6; H, 5.3; N, 10.1; Cl, 13.7.

The normally solid product became a very formable, viscous green liquid at 135°C. Films could be molded at 130°C. Spectroscopic analysis (770 nm) showed that about 90 percent of the nitroso groups were coupled to nitroso dimer at room temperature. The film showed an ultimate breaking strength of about 2,400 lb./sq in at 10 percent elongation.

EXAMPLE 44

A xylene solution of 1,4-butanediol (42.05 g, 0.465 mole), glycerol (9.30 g, 0.1 mole), adipic acid (74.53 g, 0.51 mole) and p-toluenesulfonic acid (0.5 g) was refluxed using a condenser which permitted the water formed upon esterification to be separated from the refluxing xylene. When a total of 19 ml of water had been formed, the reaction mixture was diluted with more xylene to give a solution of polyester in xylene having a solids content of 54 percent, a viscosity of 0.5 poise at room temperature, an acid number of 1.1, and an hydroxyl number of 82. By gel phase chromatography, a number average molecular weight of 2,500 and a weight average molecular weight of 4,800 were determined. Thus, this polyester has an average hydroxyl equivalent weight of 370 and has on the average 6.7 hydroxyl groups per molecule based on its number average molecular weight.

A solution was prepared from 6.84 g of the above polyester solution (0.01 eq. of hydroxyl function) and 4-nitroso-3,5-dichlorobenzoyl chloride (2.065 g, 0.01 mole) in 100 ml of dry tetrahydrofuran. To the clear green solution was added 2 ml of dry pyridine, and the mixture was held 2 hours at 60°C. After cooling to room temperature, the mixture was poured into 700 ml of methanol in a blender to precipitate the polymer. The product was washed in several changes of methanol and then dried to give 4.5 g of the 4-nitroso-3,5-dichlorobenzoate of a glycerol-modified polytetramethylene glycol/adipate. This nitroso polyester is a green fluid of low viscosity at 140°C. It was formed into a bar at 140°C and, when cooled to room temperature was an amber, tough, rubbery solid.

EXAMPLE 45

The polymeric bis-4-nitroso-4-methylpentanoyl amide of Example 21-B and the polymeric bis-urethane of Example 13 were ground to pass through a 20-mesh screen and mixed in 1:2, 1:1, and 2:1 ratios. When heated to 115°C, the mixtures give blue, clear liquids of low viscosity. At this temperature, the original physical mixture of two polymeric materials was converted to a compatible solution of the dissociated monomers (1 and 2) derived from the two polymers:

O=N-C(CH$_3$)$_2$CH$_2$CH$_2$CONH(CH$_2$)$_6$NHCOCH$_2$CH$_2$C(CH$_3$)$_2$N=O　1
and
O=N-C(CH$_3$)$_2$CH$_2$OCONH(CH$_2$)$_6$NHCOOCH$_2$C(CH$_3$)$_2$N=O　2

When the thin films of the melts on aluminum were cooled to room temperature (with loss of the blue color and redimerization of the —N=O groups to give

linkages), hard, clear, tack-free, print-resistant coatings were obtained. The —N=O groups present on 1 in the melt will upon cooling dimerize not only with other —N=O groups on like molecules but also with —N=O groups on 2. Thus, the resulting nitroso dimer polymer is a copolymer of 1 and 2 of statistical distribution of the two monomers which were present in the melt.

Since obvious modifications and equivalents in the invention will be evident to those skilled in the arts, I propose to be bound solely by the appended claims.

The embodiments of the invention in which an exclusive property or privilege is claimed are defined as follows:

1. A nitrosated precursor compound containing an average of at least two C-nitroso groups per molecule said nitroso group being attached to an aliphatic carbon atom or to an aromatic ring containing two ortho substituents of lower alkyl, lower alkoxycarbonyl or chlorine and joined by a carbonyl linkage and at least two of which are separated from the nearest nitroso group by at least six atoms, said precursor compound being
   1. organic monomers or polymers melt fabricable below 200°C; or
   ii. a melt-compatible blend of said monomers or polymers,
   said nitrosated precursor compounds coupling to polymers at ambient temperatrue by dimerization of said nitroso groups.

2. Composition of claim 1 wherein said nitrosated precursor compound is a nitrosated polyurethane.

3. Composition of claim 2 wherein said nitrosated polyurethane is obtained by reaction of hexamethylenediisocyanate with a nitroalcohol and subsequent reduction of the nitrogroup to nitrosogroup.

4. Composition of claim 3 wherein said nitroalcohol is 2-methyl-2-nitro-1-propanol.

5. Composition of claim 1 wherein said nitrosated precursor compound has the formula:

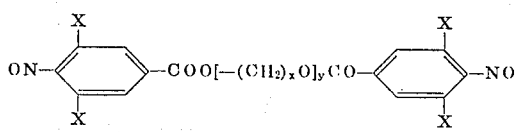

wherein X is selected from halogen, lower alkyl or lower alkoxycarbonyl; $x$ is 2 to 20 and $y$ is from 1 to an average of 100.

6. Composition of claim 5 wherein X is Cl.
7. Composition of claim 6 wherein $x$ is 2.
8. Composition of claim 1 wherein said nitrosated precursor compound is the diamide obtained by reacting a nitrosated acid or acid halide with a primary or secondary diamine of from 4 to 12 carbon atoms.

9. Composition of claim 8 wherein said nitrosated acid is nitrosated 4-methylvaleric acid.

10. Composition of claim 9 wherein said amine is hexamethylene diamine.

11. Composition of claim 8 wherein said nitrosated acid halide is

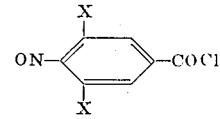

wherein $x$ is halogen, lower alkyl or lower alkoxycarbonyl.

12. Composition of claim 11 wherein X is chlorine.

13. Composition of claim 12 wherein said diamine is 1,12-diaminododecane.

14. Composition of claim 13 wherein said diamine is N,N'-diisobutylhexamethylenediamine.

15. A nitrosated polyamide consisting essentially of the reaction product of at least one aliphatic primary or secondary diamine having from 4 to 20 carbon atoms; at least one dicarboxylic acid halide selected from aliphatic dicarboxylic acid halide of 6 to 12 carbon atoms, terephthaloyl halides and isophthaloyl halides and 4-nitroso-3,5-dichloro benzoyl halide said polyamide being characterized by a melting point below 200°C and further polymerizing by coupling of nitrosogroups in the solid state.

16. Composition of claim 11 wherein said aliphatic diamine is hexamethylenediamine or hexamethylenediamine having two N-alkyl substituents of 1 to 6 carbon atoms.

17. Composition of claim 12 wherein said dicarboxylic acid halide is terephthaloyl chloride.

18. Composition of claim 12 wherein said dicarboxylic acid halide is isophthaloyl chloride.

19. A nitrosated polyester prepared by reacting a polyglycol of the formula $HO[CH_{2x}O]_yH$ wherein $x$ is 2 to 20 and $y$ is from 1 to an average of 100 with adipoyl halide or terephthaloyl halide and a nitrosated acid halide, said polymer melting below 200°C and further polymerizing by coupling of nitroso groups in the solid state.

20. A nitrosated polyester of claim 19 wherein said nitrosated acid halide is 4-nitroso-3,5-dichloro-benzoyl chloride.

21. A nitrosated polyester of claim 20 wherein $x$ is 2.

22. Composition of claim 1 wherein said precursor compound is a polymer of a diolefin having pendant olefinic groups.

23. Composition of claim 22 wherein said nitrosated precursor compound is nitrosated ethylene/propylene/1,4-hexadiene polymer.

24. Composition of claim 22 wherein said nitrosated precursor compound is nitrosated styrene/butadiene copolymer.

25. Composition of claim 22 wherein said nitrosated precursor compound is nitrosated ethylene/propylene/ethylidenenorbornene polymer.

26. Composition of claim 22 wherein said nitrosated precursor compound is nitrosated polybutadiene.

* * * * *

UNITED STATES PATENT OFFICE
CERTIFICATE OF CORRECTION

Page 1

PATENT NO. : 3,872,057
DATED : March 18, 1975
INVENTOR(S) : Jose F. Pazos

It is certified that error appears in the above-identified patent and that said Letters Patent are hereby corrected as shown below:

Col. 3, line 61 - "polymers" should be --polymer--;

Col. 6, line 13 - "fumarate" should be --methacrylate--;

Col. 6, line 14 - correct the spelling of "fumarate";

Col. 6, line 43 - change "of" to --or--;

Col. 6, line 63 - insert "methacrylate/" after --allyl--;

Col. 7, line 22 - "$HO(-CH_2)_3C(CH_3-)_2 -NO$" should be --$HO(CH_2)_3C(CH_3)_2-NO$--;

Col. 8, line 3 - correct the spelling of "moieties";

Col. 8, line 60 - change "contained" to --obtained--;

Col. 9, line 61 - "dichlorobenzoyl" should be --dihalobenzoyl--;

Col. 10, line 8 - "alkoxy" should be --alkoxycarbonyl--;

Col. 10, line 16 - correct the spelling of --containing--;

Col. 10, line 62 - "benzeneinsoluble" should be --benzene-insoluble--;

Col. 11, line 64 - "5percent should be --5 percent--;

Col. 16, line 44 - change "gently" to --gentle--;

Col. 16, line 47 - change "3.030" to --3030--;

UNITED STATES PATENT OFFICE
CERTIFICATE OF CORRECTION

PATENT NO. : 3,872,057
DATED : March 18, 1975
INVENTOR(S) : Jose F. Pazos

It is certified that error appears in the above-identified patent and that said Letters Patent are hereby corrected as shown below:

Col. 17, line 9 - "chuns" should be --chunks--;

Col. 17, line 27 - "(88.2/11.2 mol)" should be --(88.2/11.2 mol %)--;

Col. 17, line 34 - add "ml" after "20";

Col. 18, line 49 - change "871.5" to --87.5--;

Col. 18, line 51 - correct the spelling of "Syntheses";

Col. 18, line 59 - insert "acid" after "hydrochloric";

Col. 18, line 66 - change "+5°c" to --+5°C--;

Col. 19, line 10 - correct the spelling of "recrystallization";

Col. 19, line 11 - change "aciddimer" to --acid dimer--;

Col. 19, line 32 - correct the spelling of "4-methylvaleric";

Col. 19, line 46 - correct the spelling of "4-methylvaleramide";

Col. 19, line 47 - correct the spelling of "dissociated";

Col. 19, line 49 - "(4nitroso-" should be --(4-nitroso- --;

Col. 19, line 57 - correct the spelling of "4-methylvaleramide";

UNITED STATES PATENT OFFICE
CERTIFICATE OF CORRECTION

Page 3

PATENT NO. : 3,872,057
DATED : March 18, 1975
INVENTOR(S) : Jose F. Pazos

It is certified that error appears in the above-identified patent and that said Letters Patent are hereby corrected as shown below:

Col. 20, line 3 - change "0°c" to --0°C--;

Col. 20, line 16 - correct the spelling of "Brinkman";

Col. 20, line 17 - change "chromatography" to --chromatograph--;

Col. 20, line 44 - "4-hexaadiene" should be --4-hexadiene--;

Col. 20, line 50 - change "160°c" to --160°C--;

Col. 21, line 35 - "(1962)" should be --(1961)--;

Col. 21, line 51 - change "ther" to --ether--;

Col. 22, line 13 - correct the spelling of "overall";

Col. 22, line 54 - correct the spelling of "vigorous";

Col. 22, line 58 - "druing" should be --during--;

Col. 23, line 21 - replace the comma after "functionality" with a period;

Col. 23, line 31 - correct the spelling of "sample";

Col. 23, line 62 - insert a subscript "2" after the closing bracket;

Col. 23, line 66 - "OCO1" should be --COCl--;

Col. 24, line 53 - change "3,4-dichlorobenzoic" to --3,5-dichlorobenzoic--;

UNITED STATES PATENT OFFICE
CERTIFICATE OF CORRECTION

PATENT NO. : 3,872,057
DATED : March 18, 1975
INVENTOR(S) : Jose F. Pazos

It is certified that error appears in the above-identified patent and that said Letters Patent are hereby corrected as shown below:

Col. 25, line 15 - in the formula, change "$O(CH_2)_3O$" to --$O(CH_2)_5O$--;

Col. 26, line 15 - change "26" to --24D--;

Col. 26, line 20 - The analysis should read:
--Found: C, 60.1; H, 4.9; Cl, 6.2
          60.0      4.8       6.1--;

Col. 26, line 23 - change "150°c" to --150°C--;

Col. 28, last formula - change "$-CH_2OC$-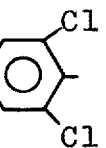" to --$-CH_2OC$-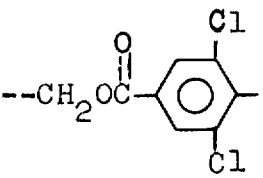--;

Col. 29, line 64 - add an opening parenthesis before "$C_{26}H_{30}Cl_4N_4O_4)_n$;

Col. 30, line 6 - add "i" before "$-C_4H_9NH(CH_2)_6NHC_4H_9-i$";

Col. 31, line 30 - partial structure should read

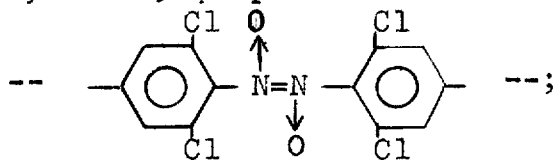

UNITED STATES PATENT OFFICE
CERTIFICATE OF CORRECTION

PATENT NO. : 3,872,057
DATED : March 18, 1975
INVENTOR(S) : Jose F. Pazos

It is certified that error appears in the above-identified patent and that said Letters Patent are hereby corrected as shown below:

Col. 33, line 27 - change "165°-165°" to --163°-165°--;

Col. 34, structure at bottom of page - move the "n" on the last line outside the closing brace.

Col. 35, line 45 - capitalize "When";

Col. 38, claim 11, next to last line - capitalize "x";

Col. 38, claim 14, line 1 - change "13" to --12--;

Col. 38, claim 16, line 1 - change "11" to --15--;

Col. 38, claim 17, line 1 - change "12" to --16--;

Col. 38, claim 18, line 1 - change "12" to --16--.

Signed and Sealed this thirteenth Day of January 1976

[SEAL]

Attest:

RUTH C. MASON
Attesting Officer

C. MARSHALL DANN
Commissioner of Patents and Trademarks